US012609920B2

(12) United States Patent
Ke

(10) Patent No.: US 12,609,920 B2
(45) Date of Patent: Apr. 21, 2026

(54) DIGITAL TWIN TASK AUTHORIZATION METHOD AND APPARATUS, COMMUNICATIONS DEVICE, AND READABLE STORAGE MEDIUM

(71) Applicant: VIVO MOBILE COMMUNICATION CO., LTD., Guangdong (CN)

(72) Inventor: Xiaowan Ke, Guangdong (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 118 days.

(21) Appl. No.: 18/592,903

(22) Filed: Mar. 1, 2024

(65) Prior Publication Data

US 2024/0205212 A1     Jun. 20, 2024

Related U.S. Application Data

(63) Continuation of application No. PCT/CN2022/116516, filed on Sep. 1, 2022.

(30) Foreign Application Priority Data

Sep. 3, 2021     (CN) .......................... 202111034442.4

(51) Int. Cl.
*H04L 9/40*          (2022.01)
(52) U.S. Cl.
CPC ..................................... *H04L 63/08* (2013.01)
(58) Field of Classification Search
CPC ...... H04L 63/08; H04L 65/1063; H04L 67/10
See application file for complete search history.

(56) References Cited

U.S. PATENT DOCUMENTS 11,283,863 B1 *   3/2022  Cleaver ................... H04L 67/10
2019/0391800 A1 *  12/2019  Lin ........................... G06F 8/65
(Continued)

FOREIGN PATENT DOCUMENTS

CN          110336718 A     10/2019
CN          112291250 A     1/2021
(Continued)

OTHER PUBLICATIONS

International Search Report for International Application No. PCT/CN2022/116516 of Nov. 25, 2022.
(Continued)

*Primary Examiner* — Javier O Guzman
(74) *Attorney, Agent, or Firm* — Perilla Knox & Hildebrandt LLP; Kenneth A. Knox

(57)          ABSTRACT
A digital twin task authorization method and apparatus, a communications device, and a readable storage medium. The digital twin task authorization method includes: obtaining, by a first communications device, first information; and performing, based on the first information, a first operation related to digital twin task authorization, where the first information includes at least one of the following: subscription information of a digital twin service of a terminal; authorization information of the digital twin service of the terminal, or authorization information of the digital twin service of the terminal and validity time information of the authorization information; and query result information, where the query result information is used to indicate that the terminal allows or disallows a digital twin task.

18 Claims, 9 Drawing Sheets

(56)     References Cited

U.S. PATENT DOCUMENTS

| | | | | |
|---|---|---|---|---|
| 2020/0059510 A1* | 2/2020 | Russom | .............. | H04L 63/0485 |
| 2020/0358617 A1* | 11/2020 | Baierlein | .............. | H04L 9/3228 |
| 2020/0387576 A1* | 12/2020 | Brett | ................... | G06F 3/04815 |
| 2021/0158307 A1* | 5/2021 | DeLuca | ........... | G06Q 10/06311 |
| 2021/0200764 A1 | 7/2021 | Ploegert et al. | | |
| 2022/0197522 A1* | 6/2022 | DeLuca | ................. | G16Y 10/75 |

FOREIGN PATENT DOCUMENTS

| | | |
|---|---|---|
| CN | 112926911 A | 6/2021 |
| CN | 113286327 A | 8/2021 |
| WO | 2021067342 A1 | 4/2021 |
| WO | 2021159891 A1 | 8/2021 |

OTHER PUBLICATIONS

First Office Action for CN Patent Application No. 2021110344424 of Mar. 29, 2025.

\* cited by examiner

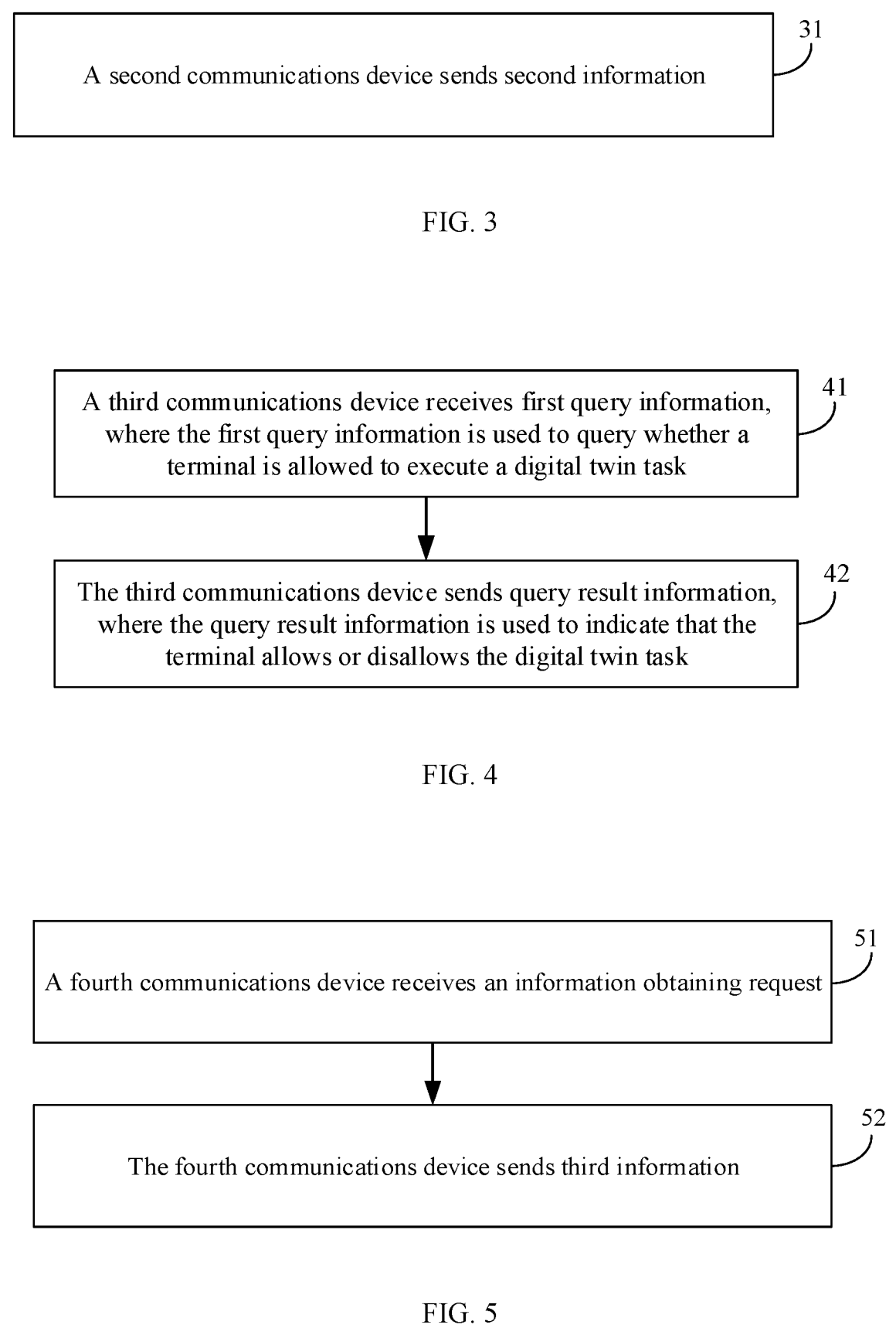

A second communications device sends second information  31

FIG. 3

A third communications device receives first query information, where the first query information is used to query whether a terminal is allowed to execute a digital twin task  41

The third communications device sends query result information, where the query result information is used to indicate that the terminal allows or disallows the digital twin task  42

FIG. 4

A fourth communications device receives an information obtaining request  51

The fourth communications device sends third information  52

FIG. 5

A fifth communications device sends a digital twin task request, where the digital twin task request includes description information of a digital twin service

61

DIGITAL TWIN TASK AUTHORIZATION METHOD AND APPARATUS, COMMUNICATIONS DEVICE, AND READABLE STORAGE MEDIUM

CROSS-REFERENCE TO RELATED APPLICATIONS

This application is a Bypass Continuation Application of PCT International Application No. PCT/CN2022/116516 filed on Sep. 1, 2022, which claims priority to Chinese Patent Application No. 202111034442.4, filed in China on Sep. 3, 2021, which are incorporated herein by reference in their entireties.

TECHNICAL FIELD

This application pertains to the field of communications technologies, and specifically relates to a digital twin task authorization method and apparatus, a communications device, and a readable storage medium.

BACKGROUND

In a digital twin domain, a network may be a virtual network, or a combination of a virtual network and a physical network; and a terminal may be a virtual terminal or a physical terminal. During execution of a digital twin task, whether to use a virtual terminal or a physical terminal, or a virtual network or a physical network often depends on a requirement, an objective, and the like of the digital twin task. When the digital twin task is executed by using the physical terminal, some special requirements such as user authorization are needed because the physical terminal may not be a terminal dedicated to the digital twin task. Therefore, how to authorize a digital twin task is an urgent technical problem that needs to be resolved.

SUMMARY

According to a first aspect, a digital twin task authorization method is provided and includes:

obtaining, by a first communications device, first information; and performing, by the first communications device based on the first information, a first operation related to digital twin task authorization, where the first information includes at least one of the following:

subscription information of a digital twin service of a terminal;

authorization information of the digital twin service of the terminal, or authorization information of the digital twin service of the terminal and validity time information of the authorization information; and query result information, where the query result information is used to indicate that the terminal allows or disallows a digital twin task.

According to a second aspect, a digital twin task authorization method is provided and includes:

sending, by a second communications device, second information, where the second information includes:

authorization information of a digital twin service of a terminal, or authorization information of a digital twin service of a terminal and validity time information of the authorization information.

According to a third aspect, a digital twin task authorization method is provided and includes:

receiving, by a third communications device, first query information, where the first query information is used to query whether a terminal is allowed to execute a digital twin task; and sending, by the third communications device, query result information, where the query result information is used to indicate that the terminal allows or disallows the digital twin task.

According to a fourth aspect, a digital twin task authorization method is provided and includes:

receiving, by a fourth communications device, an information obtaining request; and sending, by the fourth communications device, third information, where the third information includes at least one of the following:

subscription information of the digital twin service of the terminal;

authorization information of the digital twin service of the terminal;

authorization information of the digital twin service of the terminal and validity time information of the authorization information; and a subscription type of the digital twin service of the terminal, where the subscription type is either of the following: a first type and a third type, where the first type indicates that execution of a digital twin task is allowed, and the third type indicates that when a digital twin task of the terminal arrives, the terminal is queried about whether the terminal is allowed to execute the digital twin task.

According to a fifth aspect, a digital twin task authorization method is provided and includes:

sending, by a fifth communications device, a digital twin task request, where the digital twin task request includes description information of a digital twin service.

According to a sixth aspect, a digital twin task authorization apparatus is provided and includes:

an obtaining module, configured to obtain first information; and an execution module, configured to perform, based on the first information, a first operation related to digital twin task authorization, where the first information includes at least one of the following:

subscription information of a digital twin service of a terminal;

authorization information of the digital twin service of the terminal, or authorization information of the digital twin service of the terminal and validity time information of the authorization information; and query result information, where the query result information is used to indicate that the terminal allows or disallows a digital twin task.

According to a seventh aspect, a digital twin task authorization apparatus is provided and includes:

a first sending module, configured to send second information, where the second information includes:

authorization information of a digital twin service of a terminal, or authorization information of a digital twin service of a terminal and validity time information of the authorization information.

According to an eighth aspect, a digital twin task authorization apparatus is provided and includes:

a first receiving module, configured to receive first query information, where the first query information is used to query whether a terminal is allowed to execute a digital twin task; and a second sending module, configured to send query result information, where the query result information is used to indicate that the terminal allows or disallows the digital twin task.

According to a ninth aspect, a digital twin task authorization apparatus is provided and includes:

a second receiving module, configured to receive an information obtaining request; and a third sending module, configured to send third information, where the information obtaining request is used to obtain one of the following: the third information, subscription information of a terminal, and information related to a digital twin service of the terminal; and the third information includes at least one of the following:

subscription information of the digital twin service of the terminal;

authorization information of the digital twin service of the terminal;

authorization information of the digital twin service of the terminal and validity time information of the authorization information; and a list of candidate terminals for the digital twin service.

According to a tenth aspect, a digital twin task authorization apparatus is provided and includes:

a fourth sending module, configured to send a digital twin task request, where the digital twin task request includes description information of a digital twin service.

According to an eleventh aspect, a communications device is provided. The communications device includes a processor, a memory, and a program or instructions stored in the memory and capable of running on the processor. When the program or instructions are executed by the processor, the steps of the method according to the first aspect are implemented, or the steps of the method according to the second aspect are implemented, or the steps of the method according to the third aspect are implemented, or the steps of the method according to the fourth aspect are implemented, or the steps of the method according to the fifth aspect are implemented.

According to a twelfth aspect, a readable storage medium is provided. The readable storage medium stores a program or instructions. When the program or instructions are executed by a processor, the steps of the method according to the first aspect are implemented, or the steps of the method according to the second aspect are implemented, or the steps of the method according to the third aspect are implemented, or the steps of the method according to the fourth aspect are implemented, or the steps of the method according to the fifth aspect are implemented.

According to a thirteenth aspect, a chip is provided. The chip includes a processor and a communications interface. The communications interface is coupled to the processor. The processor is configured to run a program or instructions to implement the steps of the method according to the first aspect, or the steps of the method according to the second aspect, or the steps of the method according to the third aspect, or the steps of the method according to the fourth aspect, or the steps of the method according to the fifth aspect.

According to a fourteenth aspect, a computer program or program product is provided. The computer program or program product is stored in a non-transitory storage medium. The computer program or program product is executed by at least one processor to implement the steps of the method according to the first aspect, or the steps of the method according to the second aspect, or the steps of the method according to the third aspect, or the steps of the method according to the fourth aspect, or the steps of the method according to the fifth aspect.

According to a fifteenth aspect, a communications device is provided. The communications device is configured to perform the steps of the method according to the first aspect, or configured to perform the steps of the method according to the second aspect, or configured to perform the steps of the method according to the third aspect, or configured to perform the steps of the method according to the fourth aspect, or configured to perform the steps of the method according to the fifth aspect.

BRIEF DESCRIPTION OF DRAWINGS

A person of ordinary skill in the art can clearly understand various other advantages and benefits by reading the detailed description of the preferred embodiments below. The accompanying drawings are merely intended to illustrate the preferred embodiments and are not considered as limitations on this application. Throughout the accompanying drawings, same reference numerals represent same components. In the accompanying drawings:

FIG. 3 is a flowchart of another digital twin task authorization method according to an embodiment of this application;

FIG. 4 is a flowchart of another digital twin task authorization method according to an embodiment of this application;

FIG. 5 is a flowchart of another digital twin task authorization method according to an embodiment of this application;

DESCRIPTION OF EMBODIMENTS

Figure 1:
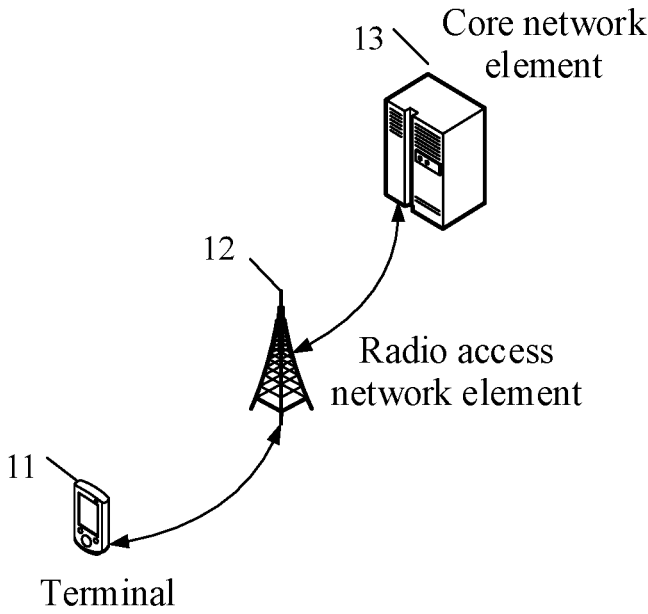
FIG. 1 is a block diagram of a wireless communications system to which an embodiment of this application may be applied.

The following clearly describes the technical solutions in the embodiments of this application with reference to the accompanying drawings in the embodiments of this application. Apparently, the described embodiments are only some rather than all of the embodiments of this application. All other embodiments obtained by a person of ordinary skill in the art based on the embodiments of this application shall fall within the protection scope of this application.

In the specification and claims of this application, the term "comprise" and any other variants thereof are intended to cover the non-exclusive inclusion, for example, a process, method, system, product, or device that includes a list of steps or units is not necessarily limited to those expressly listed steps or units, but may include other steps or units not expressly listed or inherent to such a process, method, system, product, or device. In addition, in the specification and claims, the use of "and/or" represents presence of at least one of the connected objects, for example, "A and/or B" indicates the following three cases: A alone, B alone, or both A and B.

The terms "first", "second", and the like in this specification and claims of this application are used to distinguish between similar objects instead of describing a specified order or sequence. It should be understood that the terms used in this way are interchangeable in appropriate circumstances, so that the embodiments of this application can be implemented in other orders than the order illustrated or described herein. In addition, objects distinguished by "first" and "second" usually fall within one class, and a quantity of objects is not limited. For example, there may be one or more first objects. In addition, the term "and/or" in the specification and claims indicates at least one of connected objects, and the character "/" generally represents an "or" relationship between associated objects.

In an optional embodiment of this application, the term "capable" may indicate at least one of the following: allowed, supported, preferred, and preferentially capable. The term "incapable" may indicate at least one of the following: not allowed, not supported, disallowed, not preferred, and not capable.

In the embodiments of this application, obtaining may be understood as generating, obtaining from a configuration, receiving, receiving by requesting, obtaining by self-learning, obtaining by deducing based on unreceived information, or obtaining after processing based on received information, which may be specifically determined based on actual requirements and is not limited in the embodiments of this application.

In the embodiments of this application, sending may include broadcasting, broadcasting in system information, returning in response to a request, sending dedicated signaling, or the like.

In the embodiments of this application, a network includes a mobile communications network.

The following describes the embodiments of this application with reference to the accompanying drawings. A digital twin task authorization method and apparatus, a communications device, and a readable storage medium provided in the embodiments of this application are not limited to a long term evolution (LTE)/LTE-Advanced (LTE-A) system, and can also be used in other wireless communications systems, such as code division multiple access (CDMA), time division multiple access (TDMA), frequency division multiple access (FDMA), orthogonal frequency division multiple access (OFDMA), single-carrier frequency-division multiple access (SC-FDMA), and other systems. The terms "system" and "network" in the embodiments of this application are usually used interchangeably. The described technologies may be used for the foregoing systems and radio technologies, and may also be used for other systems and radio technologies. However, in the following descriptions, the new radio (NR) system is described for an illustrative purpose, and NR terms are used in most of the following descriptions. These technologies may also be applied to other applications than an NR system application, for example, a 6th Generation (6G) communications system.

The digital twin task authorization method and apparatus, communications device, and readable storage medium provided in the embodiments of this application may be applied to a network system shown in FIG. 1. The network system shown in FIG. 1 includes a terminal 11, a radio access network element 12 and a core network element 13.

In an embodiment of this application, the terminal 11 may be a terminal (such as a virtual terminal) or a physical terminal (such as a physical terminal) in a digital twin domain; the radio access network element 12 may be a radio access network (such as a virtual radio access network element) in the digital twin domain or a radio access network element (such as a physical radio access network element) in a physical network; and the core network element 13 may be a core network element (such as a virtual core network element) in the digital twin domain or a core network element (such as a physical core network element) in the physical network.

In an implementation, the core network element may support the digital twin domain (for example, some resources in the core network element in the physical network are defined to support the digital twin domain). The radio access network element may support the digital twin domain (for example, some resources in the radio access network element in the physical network are defined to support the digital twin domain).

In an embodiment of this application, the communications device may include at least one of the following: a communications network element and a terminal.

In an embodiment of this application, the communications network element may include at least one of the following: a core network element and a radio access network element.

In an embodiment of this application, the core network element 13 may be referred to as at least one of the following: a core network device, a core network node, a core network function, and a core network unit. The core network element may include but is not limited to at least one of the following: a network element used for twin task management, a mobility management entity (MME), an access and mobility management function (AMF), a session management function (SMF), a user plane function (UPF), a serving gateway (SGW), a public data network (PDN) gateway, a policy control function (PCF), a policy and charging rules function (PCRF), a serving general packet radio service (GPRS) support node (SGSN), a gateway GPRS support node (GGSN), unified data management (UDM), a unified data repository (UDR), a home subscriber server (HSS), an application function (AF), and a centralized network configuration (CNC).

In an embodiment of this application, the radio access network element 12 may be referred to as at least one of the following: a radio access network device, a radio access network node, a radio access network function, and a radio access network unit; and the radio access network element may include but is not limited to at least one of the following: a radio access network device, a radio access network node, a radio access network function, a radio access network unit, a Third Generation Partnership Project (3GPP) radio access network, a non-3GPP radio access network, a centralized unit (CU), a distributed unit (DU), a base station, an evolved NodeB (eNB), a 5th Generation mobile communications (5G) NodeB (gNB), a radio network controller (RNC), a NodeB (NodeB), a non-3GPP inter working function (N3IWF), an access control (AC) node, an access point (AP) device, or a wireless local area network (WLAN) node.

The base station may be a base transceiver station (BTS) in a global system for mobile communications (GSM) system or a code division multiple access (CDMA) system, or may be a NodeB (NodeB) in wideband code division multiple access (WCDMA) system, or may be an evolved NodeB (eNB, or e-NodeB) in LTE or a 5G NodeB (gNB). This is not limited in the embodiments of this application.

In an embodiment of this application, UE is a terminal. The terminal 11 may include a relay that supports a terminal function and/or a terminal that supports a relay function. The terminal may also be referred to as a terminal device or a user equipment (UE). The terminal may be a terminal-side device such as a mobile phone, a tablet personal computer, a laptop computer, a personal digital assistant (PDA), a mobile Internet device (MID), an augmented reality (AR) or virtual reality (VR) device, a robot, a wearable device, or a vehicular device. It should be noted that a specific type of the terminal is not limited in the embodiments of this application.

In addition, the embodiments of this application may be applied to communications systems such as 4th Generation mobile communications (4G), 5G, and 6G.

Digital twins may be used to simulate statuses of a physical network and a physical terminal to implement verification, performance simulation, and the like on new services and new technologies to reduce costs and improve reliability. Digital twin tasks may be service procedures, service functions, and the like to be executed in the digital twin domain. A digital twin task (for example, the terminal initiates a call process of a calling party) may require cooperation between the terminal and the network.

In the embodiments of this application, the following problem also needs to be resolved:

For a physical terminal, because the terminal may not be a terminal dedicated to a digital twin task, for execution of the digital twin task, some special requirements are needed, for example, user authorization, whether the terminal is allowed to execute the digital twin task, and a condition for allowing or disallowing the terminal to execute the digital twin task. For example, the condition for allowing the terminal to execute the digital twin task is: an allowed time, an allowed location, who delivers the allowed digital twin task, or a type of the allowed digital twin task (such as verification of a new service or authentication of a new technology).

In the digital twin domain, a network may be a virtual network, or a combination of a virtual network and a physical network; and a terminal may be a virtual terminal or a physical terminal. Whether to use a virtual terminal or a physical terminal or use a virtual network or a physical network to execute a digital twin task depends on a requirement and an objective of the digital twin task. For example, a physical terminal may be more suitable for testing service performance within coverage of an area. For example, a virtual terminal and a virtual network are feasible for testing an end-to-end procedure. For example, a physical test terminal from a manufacturer is more suitable for testing an end-to-end procedure of a new technology. For a physical network, some network resources may be defined to execute a digital twin task and used in the digital twin domain.

In an optional embodiment of this application, the digital twin domain includes at least one of the following: a virtual network (such as a virtual core network and a virtual radio access network), a combination of a virtual network and a physical network (such as a virtual core network and a radio access network of a physical network), a resource used for a digital twin service in a physical network, a virtual terminal, and a physical terminal.

In an optional embodiment of this application, the physical network is a network that actually provides a network service. The virtual network is a simulation of the physical network. In an optional embodiment of this application, a digital twin task may include executing one of the following in the digital twin domain: a service (including a service procedure, a service function, or the like), a network function, a policy (such as a network policy or a policy used for a terminal), fault recurrence, a test task, and the like. The digital twin task may be used, without limitation, for one of the following: verifying a new service, verifying a new technology, troubleshooting and network optimization, providing a basis for network expansion, verifying an optimization effect of a policy, and the like.

In an optional embodiment of this application, the digital twin service includes one of the following: one or more digital twin tasks, and all digital twin tasks of a terminal.

In another optional embodiment of this application, the digital twin service is equivalent to a digital twin task.

In an optional embodiment of this application, the time information, time period, time period range, and time interval include one of the following: a start time, duration, and an end time. Timing of the duration starts from the start time or starts from reception of the time information. An end time of timing of the duration may be used as the end time.

The digital twin task authorization method and apparatus, communications device, and readable storage medium provided in the embodiments of this application are hereinafter described in detail by using some embodiments and application scenarios thereof with reference to the accompanying drawings.

Figure 2:
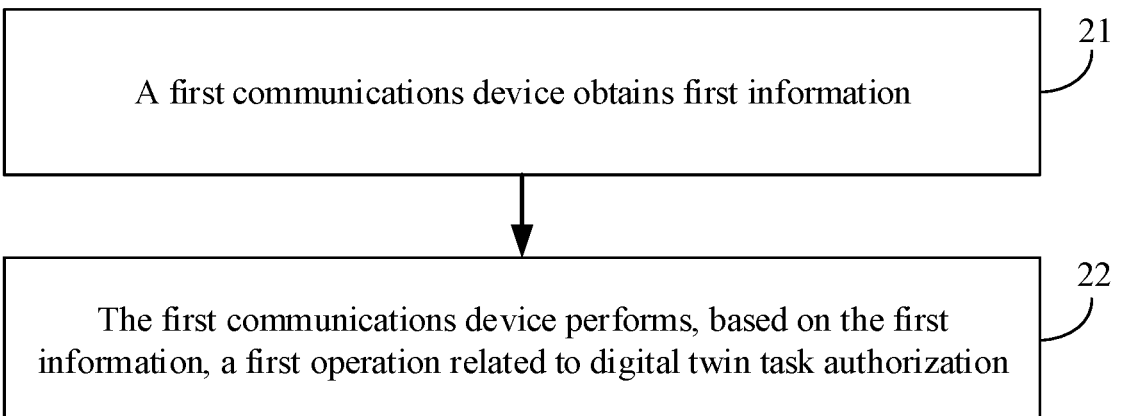
FIG. 2 is a flowchart of a digital twin task authorization method according to an embodiment of this application.

FIG. 2 is a flowchart of a digital twin task authorization method according to an embodiment of this application. The method is applied to a first communications device. The first communications device includes but is not limited to a network element used for twin task management. As shown in FIG. 2, the method includes the following steps.

Step 21: A first communications device obtains first information.

In this embodiment, the first information may include at least one of the following:

subscription information of a digital twin service of a terminal;

authorization information of the digital twin service of the terminal, or authorization information of the digital twin service of the terminal and validity time information of the authorization information; and query result information, where the query result information is used to indicate that the terminal allows or disallows a digital twin task.

Optionally, the digital twin service includes one or more digital twin tasks.

Optionally, the authorization information of the digital twin service of the terminal is obtained from one of the following: the terminal, an application function AF, and a network element (such as a UDR or UDM) used for user data management. In an implementation, the authorization information provided by the terminal or AF is stored in the network element used for user data management and can be invoked by other network elements.

Optionally, the subscription information of the digital twin service of the terminal may be obtained from the network element (such as the UDR or UDM) used for user data management.

Optionally, the query result information is query result information related to each digital twin task.

Optionally, the query result information is obtained from one of the following: the terminal, the AF, and the network element (such as the UDR or UDM) used for user data management. In an implementation, the query result information provided by the terminal or AF is stored in the network element used for user data management and can be invoked by other network elements.

Step 22: The first communications device performs, based on the first information, a first operation related to digital twin task authorization.

It is easy to understand that, in this embodiment, the first operation related to digital twin task authorization is performed based on the obtained first information, where the first information includes at least one of the following: the subscription information of the digital twin service of the terminal; the authorization information of the digital twin service of the terminal, or the authorization information of the digital twin service of the terminal and the validity time information of the authorization information; and the query result information, where the query result information is used to indicate that the terminal allows or disallows the digital twin task. Therefore, authorization of the digital twin task can be implemented, and a physical terminal is supported in authorization of the digital twin task.

In this embodiment of this application, the performing a first operation related to digital twin task authorization may include at least one of the following:

determining that the terminal is allowed or disallowed to execute the digital twin task (by default, an ordinary terminal may be disallowed to execute a digital twin task);

determining to accept or not to accept the digital twin task (for example, determining to accept or not to accept an arriving digital twin task);

determining a list of candidate terminals for the digital twin service; and sending first query information, where the first query information is used to query whether the terminal is allowed to execute the digital twin task.

Therefore, based on the obtained first information, a network such as a twin task management network element can be supported in determining whether to accept the digital twin task, selecting a candidate terminal for executing the digital twin task, and the like.

In an implementation, after determining the list of candidate terminals for the digital twin service, the first communications device may send the list of candidate terminals to a fourth communications device, such as the network element (such as the UDR or UDM) used for user data management, so that the list of candidate terminals is stored for subsequent use.

In an implementation, in a case that the digital twin task arrives, the first communications device performs, based on the obtained first information, the first operation related to digital twin task authorization.

Optionally, the performing a first operation related to digital twin task authorization includes: the first communications device determines to accept the digital twin task, and determines a list of terminals for the accepted digital twin task.

Optionally, the subscription information of the digital twin service of the terminal may include at least one of the following:

allowing or disallowing execution of the digital twin service;

a condition under which the terminal is allowed to execute the digital twin task, and/or a condition under which the terminal is disallowed to execute the digital twin task;

a subscription type; and a range within which execution of the digital twin task is allowed, and/or a range within which execution of the digital twin task is disallowed.

Optionally, the authorization information of the digital twin service of the terminal may include at least one of the following:

complying with the subscription information of the digital twin service;

allowing or disallowing execution of the digital twin service;

a condition under which the terminal is allowed to execute the digital twin task, and/or a condition under which the terminal is disallowed to execute the digital twin task; and a range within which execution of the digital twin task is allowed, and/or a range within which execution of the digital twin task is disallowed.

In an implementation, disallowing execution of the digital twin service includes: disallowing execution of any digital twin task.

In an implementation, allowing execution of the digital twin service is equivalent to complying with the subscription information of the digital twin service.

It is easy to understand that even if the terminal has subscribed to allow the digital twin service, in a user's preference, the terminal may be temporarily disallowed to execute the digital twin service, and sends authorization information to the network. In this case, a priority of the authorization information is higher than a priority of the subscription information. In a case that the terminal resumes being allowed to execute the digital twin service, the terminal may still notify the network by using authorization information. In this case, the network may comply with the subscription information of the digital twin service to determine that each arriving digital twin task is allowed to be executed.

Optionally, the condition under which the terminal is allowed to execute the digital twin task, in the subscription information and/or the authorization information, may include at least one of the following:

a first location interval range of the terminal;

a first time period range;

a first available power range of the terminal, where for example, available power is more than or equal to x1%, where x1 may be set based on an actual requirement and is not limited; and a first available resource range of the terminal, where for example, available computing and/or storage resources are more than or equal to x2%, where x2 may be set based on an actual requirement and is not limited.

In an implementation, the first location interval range of the terminal includes an identifier of a location interval, such as a cell list or a tracking area (TA) list, and may be used to indicate that the terminal is allowed to execute the digital twin task only within this location interval; or the location interval for executing the digital twin task is not limited.

In an implementation, the first time period range includes a start time, duration, an end time, and the like, and may be used to indicate that the terminal is allowed to execute the digital twin task only within this time period; or the time period for executing the digital twin task is not limited, and this is applicable to a terminal dedicated to the digital twin task. Timing of the duration may start from the start time or start from reception of the time period range. Ending of timing of the duration represents the end time.

In an implementation, the first available power range of the terminal indicates that the digital twin task is executed only in a case that the terminal satisfies this available power range.

In an implementation, the first available resource range of the terminal indicates that the digital twin task is executed only in a case that computing/storage resources of the terminal satisfy this available resource range.

In an implementation, a default value of any one of the foregoing ranges includes: no limitation.

Optionally, the range within which execution of the digital twin task is allowed, in the subscription information and/or the authorization information, may include at least one of the following:
- a second location interval range;
- a second time period range;
- a first power consumption range of the task, where for example, power consumption of the digital twin task is less than or equal to y1% or not limited, where y1 may be set based on an actual requirement and is not limited;
- a first terminal capability range required by the task, where for example, a terminal capability required by the task may be an application function, a non-access stratum (NAS), an access stratum (AS), or a combination of the foregoing functions;
- a first resource consumption range of the task, where for example, computing resources and/or storage resources for the digital twin task are less than or equal to y2%, where y2 may be set based on an actual requirement and is not limited;
- description information of the allowed digital twin task; and
- information about a requester (for example, a consumer) allowed to request the twin task.

In an implementation, the second location interval range includes an identifier of a location interval, such as a cell list or a TA list, and indicates that only a digital twin task whose location is within the location interval is allowed to be executed.

In an implementation, the second time period range includes a start time, duration, an end time, and the like, and indicates that only a digital twin task whose time is within this time period is allowed to be executed. Timing of the duration may start from the start time or start from reception of the time period range. Ending of timing of the duration represents the end time.

In an implementation, the first power consumption range of the task indicates that a digital twin task whose power consumption is less than or equal to a requirement of this power consumption range is allowed.

In an implementation, the first resource consumption range of the task indicates that a digital twin task whose resource consumption is less than or equal to this resource consumption range is allowed.

In an implementation, a default value of the foregoing ranges includes: no limitation. For example, for the allowed digital twin task, the location interval is not limited, the time period is not limited, and/or the power consumption is not limited.

Optionally, the condition under which the terminal is disallowed to execute the digital twin task, in the subscription information and/or the authorization information, may include at least one of the following:
- a third location interval range of the terminal;
- a third time period range;
- a second available power range of the terminal, where for example, available power is less than or equal to x3%, where x3 may be set based on an actual requirement and is not limited; and
- a second available resource range of the terminal, where for example, available computing and/or storage resources are less than or equal to x2%, where x2 may be set based on an actual requirement and is not limited.

In an implementation, the third location interval range of the terminal includes an identifier of a location interval, such as a cell list cell list or a tracking area list TA list, and may be used to indicate that the terminal is disallowed to execute the digital twin task within this location interval; or the location interval for executing the digital twin task is not limited.

In an implementation, the third time period range includes a start time, duration, an end time, and the like, and may be used to indicate that the terminal is disallowed to execute the digital twin task within this time period; or the time period for executing the digital twin task is not limited.

In an implementation, the second available power range of the terminal indicates that the digital twin task is not executed in a case that the terminal satisfies this available power range.

In an implementation, the second available resource range of the terminal indicates that the digital twin task is not executed in a case that computing/storage resources of the terminal satisfy this available resource range.

In an implementation, a default value of any one of the foregoing ranges includes: no limitation.

Optionally, the range within which execution of the digital twin task is disallowed, in the subscription information and/or the authorization information, may include at least one of the following:
- a fourth location interval range;
- a fourth time period range;
- a second power consumption range of the task, where for example, power consumption of the digital twin task is less than or equal to y2% or not limited, where y2 may be set based on an actual requirement and is not limited;
- a second terminal capability range required by the task, where for example, a terminal capability required by the task may be an application function, a NAS, an AS, or a combination of the foregoing functions;
- a second resource consumption range of the task, where for example, computing resources and/or storage resources for the digital twin task are less than or equal to y4%, where y4 may be set based on an actual requirement and is not limited;

description information of the disallowed digital twin task; and information about a requester (for example, a consumer) disallowed to request the twin task.

In an implementation, the fourth location interval range includes: an identifier of a location interval, for example, a cell list or a TA list. The fourth location interval range indicates that a digital twin task whose location is within the location interval is disallowed to be executed.

In an implementation, the fourth time period range includes: a start time, duration, an end time, and the like. The fourth time period range indicates that a digital twin task whose time is within this time period is disallowed to be executed. Timing of the duration may start from the start time or start from reception of the time period range. Ending of timing of the duration represents the end time.

In an implementation, the second power consumption range of the task indicates that a digital twin task whose power consumption is less than or equal to a requirement of this power consumption range is disallowed.

In an implementation, the second resource consumption range of the task indicates that a digital twin task whose resource consumption is less than or equal to this resource consumption range is disallowed.

In an implementation, a default value of the foregoing ranges includes: no limitation. For example, for the disallowed digital twin task, the location interval is not limited, the time period is not limited, and/or the power consumption is not limited.

Optionally, the description information of the allowed digital twin task or the description information of the disallowed digital twin task may include at least one of the following:

a type of the twin task, for example, verification of a new service, verification of a new technology, simulation, or fault recurrence;

requiring an installation package or not requiring an installation package, where for example, the installation package may include but is not limited to an installation package of an operating system (OS) version, a modem version, an application (APP), or the like;

a permission requirement on the terminal, where for example, the permission requirement includes but is not limited to a permission to use a camera, a NAS, an AS, storage, an album, or the like;

a capability requirement on the terminal;

power consumption on the terminal;

resource consumption on the terminal, where for example, the resource consumption includes but is not limited to power consumption, storage (for example, memory) consumption (for example, central processing unit (CPU) usage), computational consumption (for example, power consumption), and the like;

a task execution location; and a task execution time.

In an implementation, if a type of digital twin task requires an installation package, and costs are high or the terminal disallows the installation package, the terminal may be disallowed to execute the digital twin task; or if a type of digital twin task does not require an installation package, the terminal may be allowed to execute the digital twin task.

In another implementation, if a type of digital twin task requires a permission of a camera, but the terminal does not want to assign the permission of the camera, the terminal may be disallowed to execute the digital twin task.

Optionally, the subscription type in the subscription information may include any one of the following:

a first type, where the first type indicates that execution of the digital twin service is allowed;

a second type, where the second type indicates that execution of the digital twin service is disallowed; and a third type, where the third type indicates that when the digital twin task of the terminal arrives, the terminal needs to be queried about whether the terminal is allowed to execute the digital twin task.

Optionally, in a case that the first information includes the authorization information of the digital twin service of the terminal and the subscription information of the digital twin service of the terminal, at least one of the following is satisfied:

a priority of the authorization information is higher than a priority of the subscription information;

when the authorization information includes allowing execution of the digital twin service or complying with the subscription information of the digital twin service, the first operation related to digital twin task authorization is performed based on the subscription information; and when the authorization information includes disallowing execution of the digital twin service (regardless of whether the subscription information allows the digital twin service), the first operation performed based on the authorization information includes at least one of the following: determining that the terminal is disallowed to execute the digital twin task, and determining not to accept the digital twin task.

In an implementation, the priority of the authorization information of the digital twin service of the terminal is higher than the priority of the subscription information. For example, if authorization information of a digital twin service of a terminal includes disallowing execution of the digital twin service, but subscription information of the digital twin service of the terminal includes allowing execution of a digital twin task, the first communications device determines not to accept the digital twin task.

In an implementation, when the authorization information of the digital twin service of the terminal includes disallowing execution of the digital twin service, and the digital twin task arrives, even if the subscription information of the digital twin service of the terminal includes allowing execution of the digital twin service, the first communications device rejects or disallows the digital twin task of the terminal.

In an implementation, when the authorization information of the digital twin service of the terminal includes allowing execution of the digital twin service, and the digital twin task arrives, the first communications device determines, based on the subscription information of the digital twin service of the terminal, that the terminal is allowed or disallowed to execute the digital twin task.

In an implementation, when the digital twin task of the terminal arrives, and a subscription type of the digital twin task is the third type, and the authorization information of the digital twin service of the terminal that is sent by the terminal or the AF exists, the first communications device determines, based on the authorization information, whether the terminal allows the digital twin task, and does not need to send first query information to the terminal, that is, there is no need to query whether the terminal is allowed to execute the digital twin task.

Optionally, when the first information includes the query result information, before obtaining the first information, the first communications device may further send first query information to the terminal when the digital twin task arrives, where the first query information is used to query whether the terminal is allowed to execute the digital twin task. Then the first communications device receives the query result information from the terminal to learn whether the terminal is allowed to execute the digital twin task.

(1) Optionally, for performing the first operation related to digital twin task authorization, when a first condition is satisfied, the first communications device determines that the terminal is allowed to execute the digital twin task.

The first condition includes at least one of the following:
the authorization information includes allowing execution of the digital twin service or complying with the subscription information of the digital twin service;
the subscription information includes allowing execution of the digital twin task;
a subscription type in the subscription information is a first type;
the subscription type in the subscription information is a third type, and the obtained query result information indicates that the terminal allows the digital twin task; or the subscription type in the subscription information is a third type, and the authorization information includes allowing execution of the digital twin service;
the terminal complies with a condition under which the terminal is allowed to execute the digital twin task, in the subscription information and/or the authorization information; and
the digital twin task complies with a range within which execution of the digital twin task is allowed, in the subscription information and/or the authorization information.

(2) Optionally, for performing the first operation related to digital twin task authorization, when a second condition is satisfied, the first communications device determines that the terminal is disallowed to execute the digital twin task.

The second condition includes at least one of the following:
the authorization information includes disallowing execution of the digital twin service;
the subscription information includes disallowing execution of the digital twin task;
a subscription type in the subscription information is a second type;
the subscription type in the subscription information is a third type, and the obtained query result information indicates that the terminal disallows the digital twin task; or the subscription type in the subscription information is a third type, and the authorization information includes disallowing execution of the digital twin service;
the terminal does not comply with a condition under which the terminal is allowed to execute the digital twin task, in the subscription information and/or the authorization information, or the terminal complies with a condition under which the terminal is disallowed to execute the digital twin task, in the subscription information and/or the authorization information; and
the digital twin task does not comply with a range within which execution of the digital twin task is allowed, in the subscription information and/or the authorization information, or the digital twin task complies with a range within which execution of the digital twin task is disallowed, in the subscription information and/or the authorization information.

In an implementation, that the subscription information includes disallowing execution of the digital twin service in the second condition may further include: the subscription information includes disallowing execution of the digital twin service, and the authorization information includes allowing execution of the digital twin task or complying with the subscription information of the digital twin service. It is easy to understand that, in the authorization information in this case, allowing execution of the digital twin task is equivalent to complying with the subscription information of the digital twin service.

In an implementation, when the subscription type in the subscription information is the third type, and the authorization information includes disallowing execution of the digital twin service, it is determined that the terminal is disallowed to execute the digital twin task. It is easy to understand that the authorization information is equivalent to the actively provided query result information. Therefore, even for the third type, no repeated query is required.

(3) Optionally, for performing the first operation related to digital twin task authorization, when a third condition is satisfied, the first communications device determines to accept the digital twin task.

The third condition includes at least one of the following:
at least one terminal satisfies a condition under which the terminal is allowed to execute the digital twin task, in the subscription information and/or the authorization information;
the digital twin task satisfies a range within which execution of the digital twin task is allowed, in the subscription information and/or the authorization information;
the authorization information includes allowing execution of the digital twin service or complying with the subscription information of the digital twin service;
the subscription information includes allowing execution of the digital twin task;
a subscription type in the subscription information is a first type;
the subscription type in the subscription information is a third type, and the obtained query result information indicates that the terminal allows the digital twin task; or the subscription type in the subscription information is a third type, and the authorization information includes allowing execution of the digital twin service;
the terminal complies with the condition under which the terminal is allowed to execute the digital twin task, in the subscription information and/or the authorization information; and
the digital twin task complies with the range within which execution of the digital twin task is allowed, in the subscription information and/or the authorization information.

(4) Optionally, for performing the first operation related to digital twin task authorization, when a fourth condition is satisfied, the first communications device determines not to accept the digital twin task.

The fourth condition includes at least one of the following:
no terminal satisfies a condition under which the terminal is allowed to execute the digital twin task, in the subscription information and/or the authorization information;
the digital twin task does not satisfy a range within which execution of the digital twin task is allowed, in the subscription information and/or the authorization information;

the authorization information includes disallowing execution of the digital twin service;

the subscription information includes disallowing execution of the digital twin task;

a subscription type in the subscription information is a second type;

the subscription type in the subscription information is a third type, and the obtained query result information indicates that the terminal disallows the digital twin task; or the subscription type in the subscription information is a third type, and the authorization information includes disallowing execution of the digital twin service;

the terminal does not comply with the condition under which the terminal is allowed to execute the digital twin task, in the subscription information and/or the authorization information, or the terminal complies with a condition under which the terminal is disallowed to execute the digital twin task, in the subscription information and/or the authorization information; and the digital twin task does not comply with the range within which execution of the digital twin task is allowed, in the subscription information and/or the authorization information, or the digital twin task complies with a range within which execution of the digital twin task is disallowed, in the subscription information and/or the authorization information.

Optionally, a list of candidate terminals for the digital twin service includes terminals that may be used for the digital twin service.

(5) Optionally, for performing the first operation related to digital twin task authorization, when a fifth condition is satisfied, the first communications device determines a list of candidate terminals for the digital twin service.

The fifth condition includes at least one of the following:

the authorization information includes allowing execution of the digital twin service or complying with the subscription information of the digital twin service;

the subscription information includes allowing execution of the digital twin service;

a subscription type in the subscription information is a first type;

a subscription type of the digital twin service of the terminal is a third type, and the obtained query result information indicates that the terminal allows the digital twin task; or the subscription type in the subscription information is a third type, and the authorization information includes allowing execution of the digital twin service; and the terminal complies with a condition under which the terminal is allowed to execute the digital twin task, in the subscription information and/or the authorization information.

(6) Optionally, the sending first query information to the terminal may include: when a sixth condition is satisfied, the first communications device sends the first query information to the terminal.

The sixth condition includes at least one of the following:

a subscription type in the subscription information is a third type;

a subscription type in the authorization information is a third type; and there is no subscription information or authorization information of the digital twin service of the terminal.

Optionally, the first communications device may receive a digital twin task request, where the digital twin task request includes description information of the digital twin service.

In some embodiments, the first communications device may receive the digital twin task request from an AF or a twin task consumer.

Optionally, the digital twin task request may include a list of terminals selected to execute the digital twin service; or the digital twin task request does not include a list of terminals selected to execute the digital twin service.

It is easy to understand that this embodiment can support the physical terminal in authorization of the digital twin task, and support the network in determining whether to accept the digital twin task, selecting a candidate terminal for executing the digital twin task, and the like.

FIG. 3 is a flowchart of a digital twin task authorization method according to an embodiment of this application. The method is applied to a second communications device. The second communications device includes but is not limited to at least one of the following: a terminal (UE) and an AF. As shown in FIG. 3, the method includes the following step.

Step 31: A second communications device sends second information.

In this embodiment, the second information may include authorization information of a digital twin service of a terminal, or authorization information of a digital twin service of a terminal and validity time information of the authorization information.

In an implementation, the second communications device may send the second information to a network element (such as a core network element).

Optionally, the second communications device may send the second information to at least one of the following: a first communications device (such as a network element used for twin task management), a fourth communications device (such as a UDR or UDM), an AMF, and a network exposure function (NEF).

In an implementation, the second communications device may send the second information to the first communications device (such as the twin task management network element), so that the first communications device performs, based on the obtained second information, an operation related to digital twin task authorization.

In another implementation, the second communications device may send the second information to the fourth communications device (such as the UDR or UDM), so that the fourth communications device stores the second information. The second communications device may indirectly send the second information to the first communications device or the fourth communications device, for example, send the second information to the AMF or the NEF, and then the AMF or the NEF sends the second information to the first communications device or the fourth communications device.

It should be noted that, for specific content included in the authorization information of the digital twin service of the terminal, reference may be made to the foregoing embodiment. Details are not described herein again.

Optionally, the sending second information may include: in a case that a seventh condition is satisfied, the second communications device sends the second information. The seventh condition includes at least one of the following:

the second information is generated or updated;

a user sets the second information; and the second communications device preconfigures the second information.

Optionally, the second information may be carried and sent in one of the following: a registration request message, a service request message, and query result information, where the query result information is used to indicate that the terminal allows or disallows a digital twin task.

It is easy to understand that this embodiment can support a physical terminal or an AF in authorization of the digital twin task.

FIG. 4 is a flowchart of a digital twin task authorization method according to an embodiment of this application. The method is applied to a third communications device. The third communications device includes but is not limited to a terminal (UE). As shown in FIG. 4, the method includes the following steps.

Step 41: A third communications device receives first query information, where the first query information is used to query whether a terminal is allowed to execute a digital twin task.

Step 42: The third communications device sends query result information, where the query result information is used to indicate that the terminal allows or disallows the digital twin task.

In an implementation, the third communications device may receive the first query information from one of the following and return the corresponding query result information: a first communications device (such as a network element used for twin task management) and an AMF. In an implementation, the first communications device sends the first query information to the AMF, and the AMF sends the first query information to the third communications device. In an implementation, the third communications device sends the query result information to the AMF, and the AMF sends the query result information to the first communications device.

Optionally, the first query information may include at least one of the following:

description information of the digital twin task and a query request for authorization of the digital twin task.

Optionally, the description information of the digital twin task may include at least one of the following:

a type of the twin task;

requiring an installation package or not requiring an installation package;

a permission requirement on the terminal;

a capability requirement on the terminal;

power consumption on the terminal;

resource consumption on the terminal;

a task execution location; and a task execution time.

Optionally, the query result information further includes authorization information of a digital twin service of the terminal, or authorization information of a digital twin service of the terminal and validity time information of the authorization information.

It should be noted that, for specific content included in the authorization information of the digital twin service of the terminal and/or specific content included in the description information of the digital twin task, reference may be made to the foregoing embodiment. Details are not described herein again.

It is easy to understand that this embodiment can support a physical terminal in authorization of the digital twin task.

FIG. 5 is a flowchart of a digital twin task authorization method according to an embodiment of this application. The method is applied to a fourth communications device. The fourth communications device includes but is not limited to a network element (such as a UDR or UDM) used for user data management. As shown in FIG. 5, the method includes the following steps.

Step 51: A fourth communications device receives an information obtaining request.

The information obtaining request is used to obtain one of the following: third information, subscription information of a terminal, and information related to a digital twin service of the terminal.

It may be understood that the subscription information of the terminal includes subscription information of the digital twin service of the terminal. It is easy to understand that the subscription information of the terminal includes subscription information of one or more services. When subscription information is requested to be obtained, all the subscription information (including the subscription information of the digital twin service) of the terminal may be returned.

The information related to the digital twin service of the terminal includes but is not limited to at least one of the following: the subscription information of the digital twin service, authorization information of the digital twin service, authorization duration of the authorization information of the digital twin service, a list of candidate terminals for the digital twin service, and the like.

Step 52: The fourth communications device sends the third information.

The third information may include at least one of the following:

the subscription information of the digital twin service of the terminal;

the authorization information of the digital twin service of the terminal;

the authorization information of the digital twin service of the terminal and validity time information of the authorization information; and the list of candidate terminals for the digital twin service.

In an implementation, the fourth communications device may receive the information obtaining request from a first communications device (such as a twin task management network element) and return the third information.

In an implementation, the subscription information of the digital twin service of the terminal in the third information includes a subscription type, where the subscription type may be either of the following: a first type and a third type, where the first type indicates that execution of a digital twin task is allowed, and the third type indicates that when a digital twin task of the terminal arrives, the terminal is queried about whether the terminal is allowed to execute the digital twin task.

The subscription information of the digital twin service of the terminal is shown in FIG. 2 and is not described herein again.

The authorization information of the digital twin service of the terminal is shown in FIG. 2 and is not described herein again.

It is easy to understand that, according to this embodiment, the twin task management network element can obtain the subscription information and/or authorization information of the digital twin service of the terminal, thereby supporting determining whether to accept the digital twin task, selecting a candidate terminal for executing the digital twin task, and the like.

Figures 6, 7:
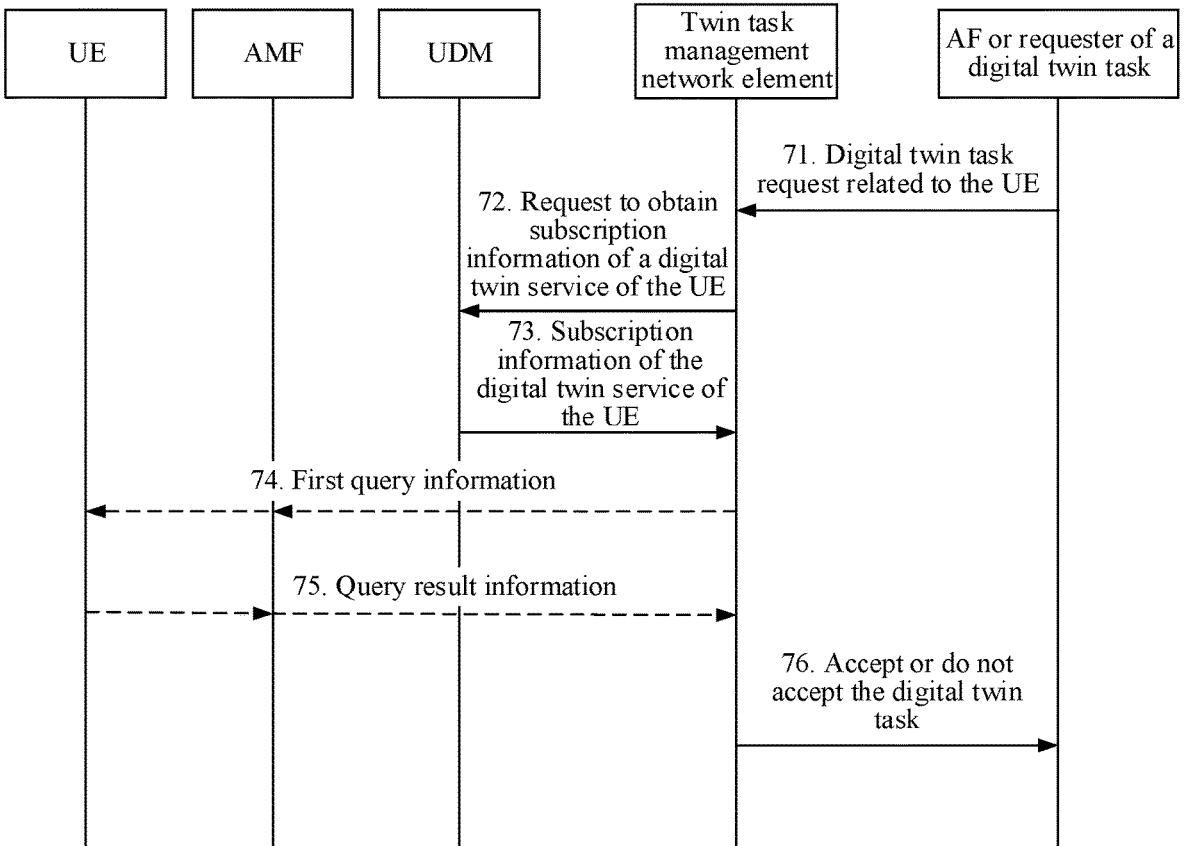
FIG. 6 is a flowchart of another digital twin task authorization method according to an embodiment of this application.
FIG. 7 is a flowchart of a digital twin task authorization process according to Embodiment 1 of this application.

FIG. 6 is a flowchart of a digital twin task authorization method according to an embodiment of this application. The method is applied to a fifth communications device. The fifth communications device includes but is not limited to an AF or a requester (for example, a consumer) of a digital twin task. As shown in FIG. 6, the method includes the following step.

Step 61: A fifth communications device sends a digital twin task request, where the digital twin task request includes description information of a digital twin service.

In some embodiments, the fifth communications device may send the digital twin task request to a first communications device (such as a network element used for twin task management, which may be referred to as a twin task management network element).

It should be noted that, for specific content included in the description information of the digital twin task, reference may be made to the foregoing embodiment. Details are not described herein again.

Optionally, the digital twin task request may include a list of terminals selected to execute the digital twin service; or the digital twin task request does not include a list of terminals selected to execute the digital twin service.

Optionally, the fifth communications device may further receive indication information, where the indication information is used to indicate whether the digital twin task is accepted, where in a case that the digital twin task is accepted, the digital twin task request further includes a list of terminals allowing the digital twin task.

In some embodiments, the fifth communications device may receive, from a terminal, indication information used to indicate whether the digital twin task is accepted.

It is easy to understand that this embodiment can support initiating the digital twin task request to the twin task management network element.

The embodiments of this application are hereinafter described in detail with reference to FIG. 7 to FIG. 10.

Embodiment 1

As shown in FIG. 7, a digital twin task authorization process in Embodiment 1 of this application includes the following steps.

Step 71: A twin task management network element receives a digital twin task request related to physical UE from an AF or a requester (consumer) of a digital twin task. The request includes description information of the digital twin task. Optionally, the request may further include a list of UEs selected to execute the digital twin task.

Step 72: Optionally, when the request in step 71 includes the list of UEs, the twin task management network element requests to obtain subscription information of a digital twin service of the UE from UDM.

Alternatively, when the request in step 71 does not include the list of UEs, the twin task management network element may selectively obtain subscription information of a digital twin service of the UE from UDM.

Step 73: The twin task management network element obtains the subscription information of the digital twin service of the UE from the UDM, to go to step 74 or step 76 based on the obtained subscription information.

For example, the subscription information includes a subscription type of the digital twin service. When the subscription type is a first type or a second type, that is, when execution of the digital twin service is allowed or execution of the digital twin service is disallowed, the process goes to step 76.

For another example, the subscription information includes a subscription type of the digital twin service. When the subscription type is a third type, that is, when the digital twin task of the terminal arrives, and the terminal needs to be queried about whether the terminal is allowed to execute the digital twin task, the process goes to step 74.

Step 74: The twin task management network element sends first query information to the UE, where the first query information is used to query whether the UE is allowed to execute the digital twin task.

Optionally, the twin task management network element may directly send the first query information to the UE, or send the first query information to the UE through an AMF.

Optionally, the first query information includes at least one of the following: the description information of the digital twin task and a query request for authorization of the digital twin task.

Step 75: The UE sends query result information to the twin task management network element, where the query result information is used to indicate that the terminal allows or disallows the digital twin task.

Step 76: The twin task management network element determines, based on the subscription information obtained in step 73 and/or based on the query result information received in step 75, to accept or not to accept the digital twin task.

When no UE satisfies the digital twin task, the digital twin task is rejected or not accepted; otherwise, the digital twin task is accepted, and a list of UEs for executing the digital twin task is determined. Optionally, when it is confirmed that the digital twin task is accepted, a list of UEs that accept the digital twin task and/or that are selected is returned to the AF or the consumer of the twin task.

Embodiment 2

Figure 8:
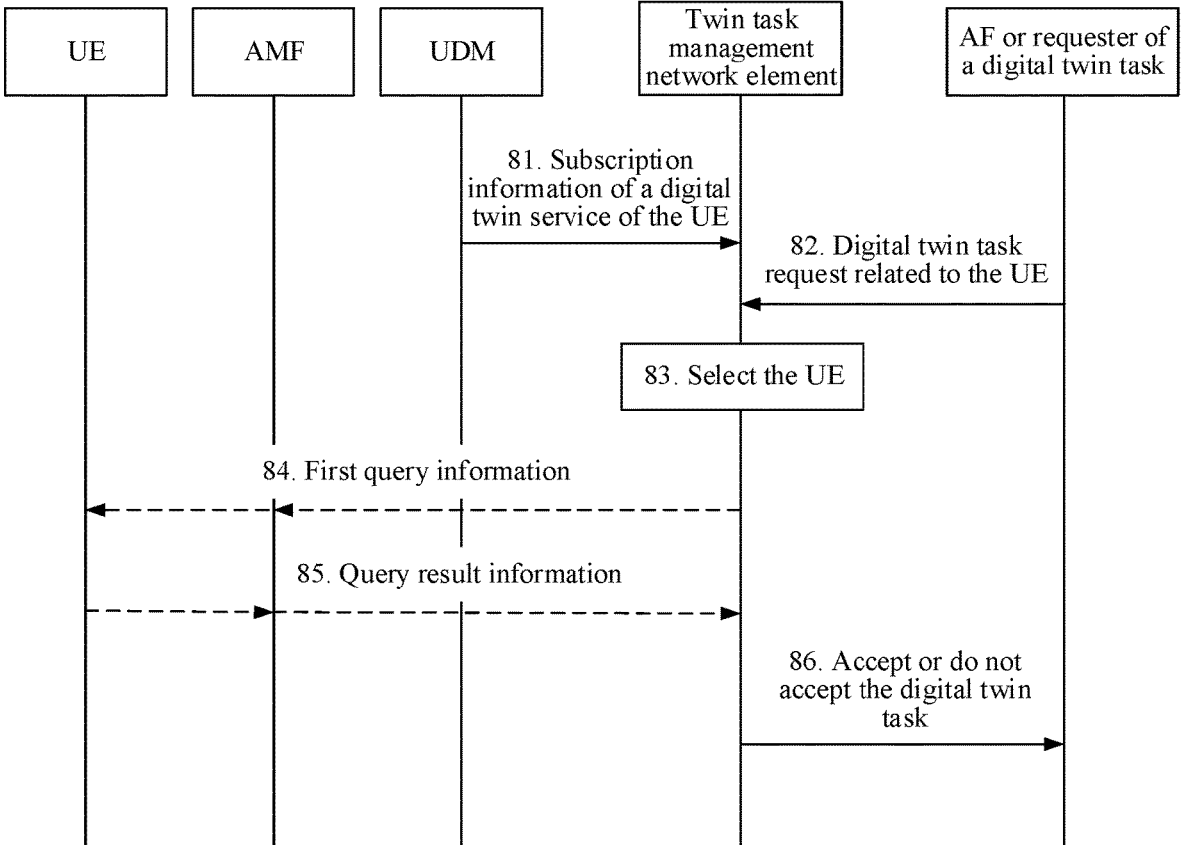
FIG. 8 is a flowchart of a digital twin task authorization process according to Embodiment 2 of this application.

As shown in FIG. 8, a digital twin task authorization process in Embodiment 2 of this application includes the following steps.

Step 81: A twin task management network element obtains subscription information of a digital twin service of UE from UDM in advance and forms a list of UEs that can execute a digital twin task.

Optionally, a subscription type in the subscription information of the digital twin service of the UE in the list of UEs includes one of the following:

a first type, allowing execution of the digital twin task; and a third type, where when the digital twin task of the terminal arrives, the terminal needs to be queried about whether the terminal is allowed to execute the digital twin task.

It is easy to understand that UE whose subscription type is a second type, that is, "disallowing execution of the digital twin task", is not in the list of UEs.

Step 82: The twin task management network element receives a digital twin task request related to physical UE from an AF or a consumer of the twin task. The request includes description information of the digital twin task. The request does not include a list of UEs selected to execute the digital twin task.

Step 83: The twin task management network element selects, based on the description information of the digital twin task, UE that satisfies a condition. For the selected UE, when a subscription type of a digital twin task of the UE is the third type, that is, when the digital twin task of the terminal arrives and the terminal needs to be queried about whether the terminal is allowed to execute the digital twin task, the process goes to step 84.

Steps 84 and 85 are the same as steps 74 and 75 in Embodiment 1, and are not described herein again.

Step 86: When no UE satisfies the digital twin task, reject or do not accept the digital twin task; otherwise, accept the digital twin task, and determine a list of UEs for executing the digital twin task. Optionally, when it is confirmed that the digital twin task is accepted, a list of UEs that accept the digital twin task and/or that are selected is returned to the AF or the consumer of the twin task.

Embodiment 3

Figure 9:
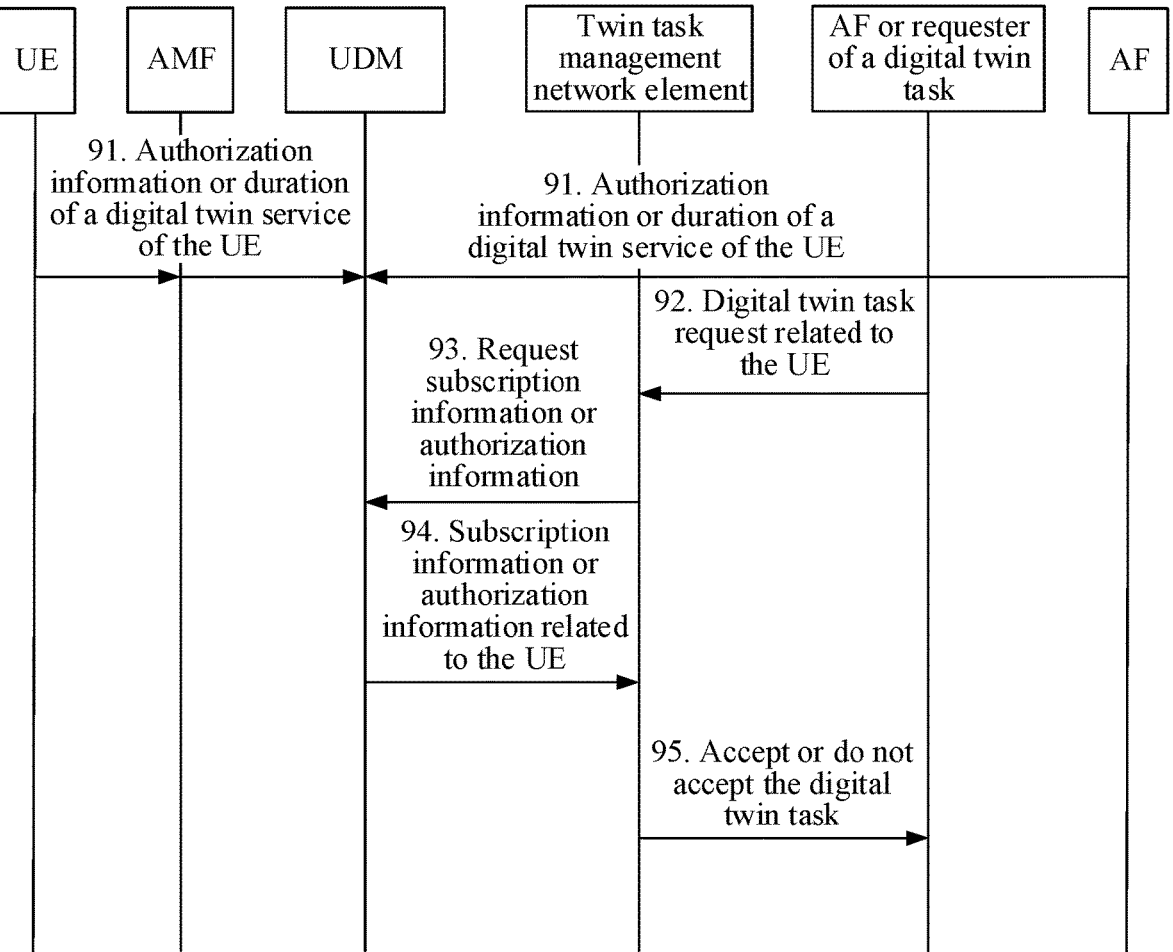
FIG. 9 is a flowchart of a digital twin task authorization process according to Embodiment 3 of this application.
Figure 10:
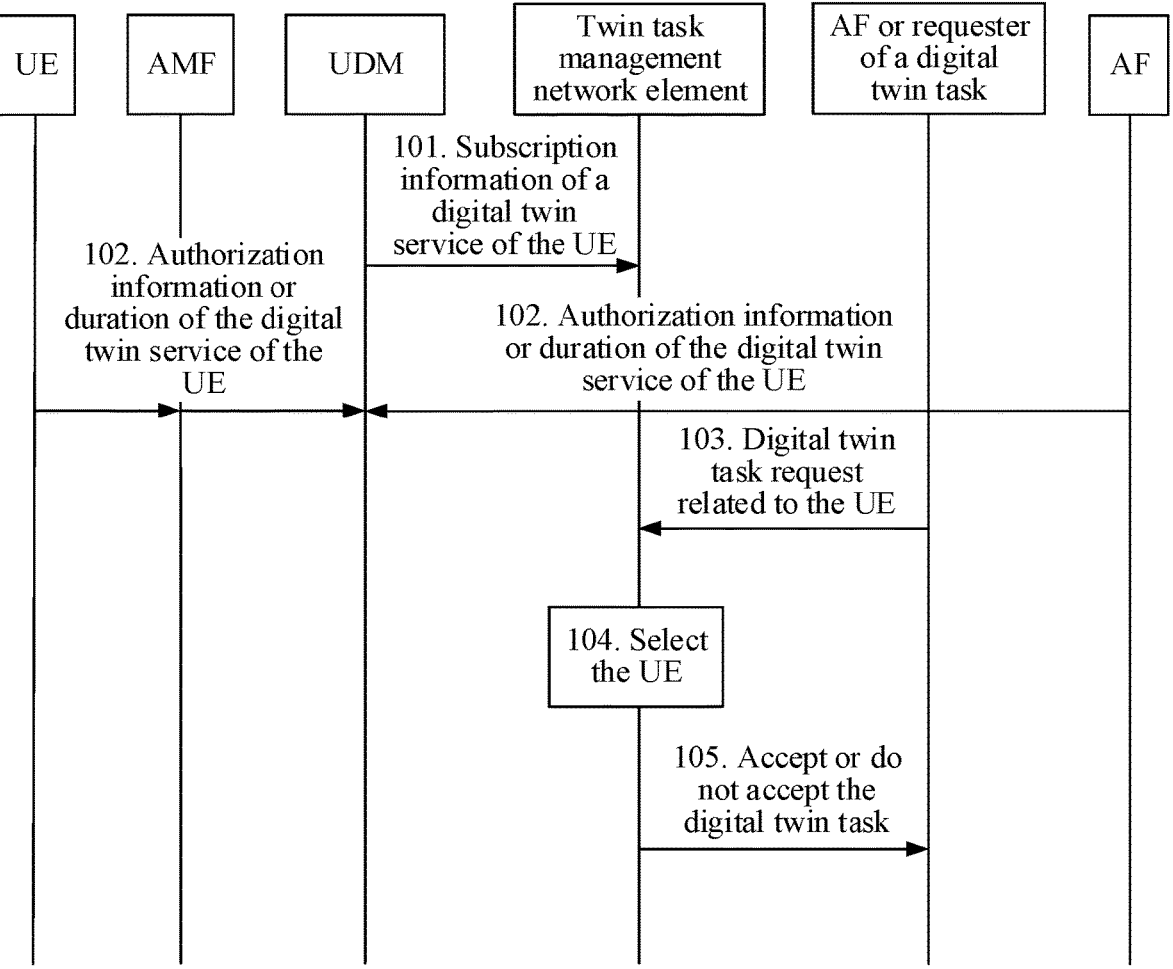
FIG. 10 is a flowchart of a digital twin task authorization process according to Embodiment 4 of this application.

As shown in FIG. 9, a digital twin task authorization process in Embodiment 3 of this application includes the following steps.

Step 91: UE or an AF sends authorization information of a digital twin service of the UE and/or validity duration of the authorization information to a network such as UDM or a UDR.

In an implementation, the network may overwrite subscription information of the digital twin service of the UE based on the authorization information of the digital twin service of the UE.

In another implementation, the network may store both the authorization information of the digital twin service of the UE and subscription information of the digital twin service of the UE.

In another implementation, the network may store the authorization information of the digital twin service of the UE, but the network does not store subscription information of the digital twin service of the UE.

Step 92: A twin task management network element receives a digital twin task request related to physical UE from the AF or a consumer of a twin task. The request includes description information of the digital twin task. Optionally, the request may further include a list of UEs selected to execute the digital twin task.

Step 93: When the request in step 92 includes the list of UEs, the twin task management network element requests to obtain subscription information and/or authorization information of a twin service of the UE from the UDM.

Step 94: The twin task management network element receives the subscription information of the twin service of the UE and/or the authorization information of the digital twin service of the UE from the UDM.

Step 95: The twin task management network element determines, based on the obtained subscription information and/or authorization information, to accept or not to accept the digital twin task.

When no UE satisfies the digital twin task, the digital twin task is rejected or not accepted; otherwise, the digital twin task is accepted, and a list of UEs for executing the digital twin task is determined. Optionally, when it is confirmed that the digital twin task is accepted, a list of UEs that accept the digital twin task and/or that are selected is returned to the AF or the consumer of the twin task.

It should be noted that, in Embodiment 3, a query process similar to step 74 in Embodiment 1 may also be triggered. Details are not described again herein.

Embodiment 4

Step 101: A twin task management network element obtains, from UDM, information about UE (for example, UE whose subscription type is a first type and/or UE whose subscription type is a third type) other than UE whose subscription type is a second type, that is, "disallowing execution of a digital twin task", and subscription information of a digital twin service of the UE, and forms a list of candidate UEs.

Step 102: UE or an AF sends authorization information of a digital twin service of the UE and/or validity duration of the authorization information to a network such as the twin task management network element.

Optionally, the twin task management network element may determine the list of candidate UEs for the digital twin task based on at least one of the following:

(1) the subscription information of the digital twin service of the UE;

(2) the authorization information of the digital twin service of the UE; and (3) the authorization information of the digital twin service of the UE and the validity duration of the authorization information.

In an implementation, the network may overwrite the subscription information of the digital twin service of the UE based on the authorization information of the digital twin service of the UE.

In another implementation, the network may store both the authorization information of the digital twin service of the UE and the subscription information of the digital twin service of the UE.

In another implementation, the network may store the authorization information of the digital twin service of the UE, but the network does not store the subscription information of the digital twin service of the UE.

Step 103: The twin task management network element receives a digital twin task request related to physical UE from the AF or a consumer of the twin task. The request includes description information of the digital twin task. The request does not include a list of UEs selected to execute the digital twin task.

Step 104: The twin task management network element determines, based on the description information of the digital twin task and the list of candidate UEs, UE that satisfies a condition.

Optionally, for the selected UE, when a subscription type of a digital twin task of the UE is the third type, that is, when the digital twin task of the terminal arrives, the terminal needs to be queried about whether the terminal is allowed to execute the digital twin task. In addition, when there is no "authorization information of the digital twin service of the UE" related to the UE or the digital twin task, the process goes to step 105.

Optionally, for the selected UE, when a subscription type of a digital twin task of the UE is the third type, that is, when the digital twin task of the terminal arrives, the terminal needs to be queried about whether the terminal is allowed to execute the digital twin task. In addition, when there is "authorization information of the digital twin service of the UE" related to the UE or the digital twin task, whether the UE executes the digital twin task may be directly determined, and the process may directly go to step 107.

Steps 105 and 106 are the same as steps 74 and 75 in Embodiment 1, and are not described herein again.

Step 107: When no UE satisfies the digital twin task, reject or do not accept the digital twin task; otherwise, accept the digital twin task, and determine a list of UEs for executing the digital twin task. Optionally, when it is confirmed that the digital twin task is accepted, a list of UEs that accept the digital twin task and/or that are selected is returned to the AF or the consumer of the twin task.

Figure 11:
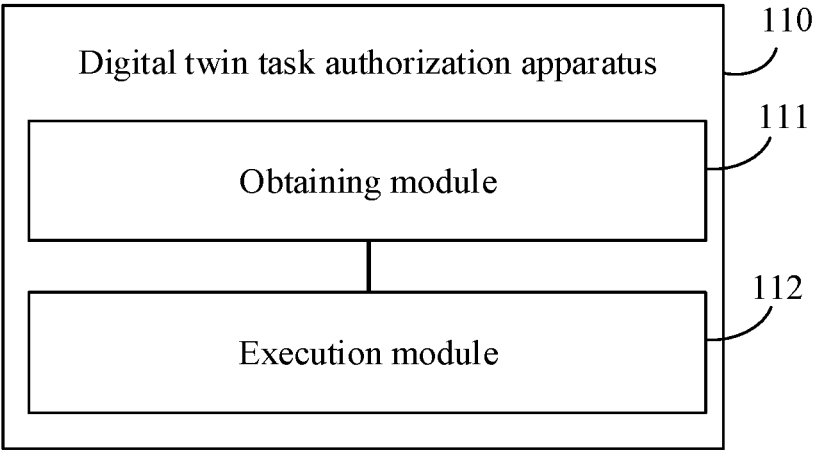
FIG. 11 is a structural diagram of a digital twin task authorization apparatus according to an embodiment of this application.

FIG. 11 is a schematic structural diagram of a digital twin task authorization apparatus according to an embodiment of this application. The apparatus is applied to a first communications device. The first communications device includes but is not limited to a twin task management network element. As shown in FIG. 11, the digital twin task authorization apparatus 110 includes:

an obtaining module 111, configured to obtain first information; and an execution module 112, configured to perform, based on the first information, a first operation related to digital twin task authorization, where the first information includes at least one of the following:

subscription information of a digital twin service of a terminal;

authorization information of the digital twin service of the terminal, or authorization information of the digital twin service of the terminal and validity time information of the authorization information; and query result information, where the query result information is used to indicate that the terminal allows or disallows a digital twin task.

Optionally, the authorization information of the digital twin service of the terminal is obtained from one of the following: the terminal and an application function AF; and/or the query result information is obtained from one of the following: the terminal and the AF.

Optionally, the execution module 112 is configured to perform at least one of the following:

determining that the terminal is allowed or disallowed to execute the digital twin task;

determining to accept or not to accept the digital twin task;

determining a list of candidate terminals for the digital twin service; and sending first query information, where the first query information is used to query whether the terminal is allowed to execute the digital twin task.

Optionally, the execution module 112 is configured to determine to accept an arriving digital twin task, and determine a list of terminals for the accepted digital twin task.

Optionally, the subscription information includes at least one of the following:

allowing or disallowing execution of the digital twin service;

a condition under which the terminal is allowed to execute the digital twin task, and/or a condition under which the terminal is disallowed to execute the digital twin task;

a subscription type; and a range within which execution of the digital twin task is allowed, and/or a range within which execution of the digital twin task is disallowed.

Optionally, the authorization information includes at least one of the following:

complying with the subscription information of the digital twin service;

allowing or disallowing execution of the digital twin service;

a condition under which the terminal is allowed to execute the digital twin task, and/or a condition under which the terminal is disallowed to execute the digital twin task; and a range within which execution of the digital twin task is allowed, and/or a range within which execution of the digital twin task is disallowed.

Optionally, the condition under which the terminal is allowed to execute the digital twin task includes at least one of the following:

a first location interval range of the terminal;

a first time period range;

a first available power range of the terminal; and a first available resource range of the terminal; and/or the range within which execution of the digital twin task is allowed includes at least one of the following:

a second location interval range;

a second time period range;

a first power consumption range of the task;

a first terminal capability range required by the task;

a first resource consumption range of the task;

description information of the allowed digital twin task; and information about a requester allowed to request the twin task; and/or the condition under which the terminal is disallowed to execute the digital twin task includes at least one of the following:

a third location interval range of the terminal;

a third time period range;

a second available power range of the terminal; and a second available resource range of the terminal; and/or the range within which execution of the digital twin task is disallowed includes at least one of the following:

a fourth location interval range;

a fourth time period range;

a second power consumption range of the task;

a second terminal capability range required by the task;

a second resource consumption range of the task;

description information of the disallowed digital twin task; and information about a requester disallowed to request the twin task.

Optionally, the description information of the allowed digital twin task or the description information of the disallowed digital twin task includes at least one of the following:

a type of the twin task;

requiring an installation package or not requiring an installation package;

a permission requirement on the terminal;

a capability requirement on the terminal;

power consumption on the terminal;

resource consumption on the terminal;

a task execution location; and a task execution time.

Optionally, the subscription type includes any one of the following:

a first type, where the first type indicates that execution of the digital twin service is allowed;

a second type, where the second type indicates that execution of the digital twin service is disallowed; and a third type, where the third type indicates that when the digital twin task of the terminal arrives, the terminal needs to be queried about whether the terminal is allowed to execute the digital twin task.

Optionally, in a case that the first information includes the authorization information of the digital twin service of the terminal and the subscription information of the digital twin service of the terminal, at least one of the following is satisfied:

a priority of the authorization information is higher than a priority of the subscription information;

when the authorization information includes allowing execution of the digital twin service or complying with the subscription information of the digital twin service, the first operation related to digital twin task authorization is performed based on the subscription information; and when the authorization information includes disallowing execution of the digital twin service, the first operation performed based on the authorization information includes at least one of the following: determining that the terminal is disallowed to execute the digital twin task, and determining not to accept the digital twin task.

Optionally, the first information includes the query result information; and the digital twin task authorization apparatus 110 further includes:

a sending module, configured to send first query information to the terminal when the digital twin task arrives, where the first query information is used to query whether the terminal is allowed to execute the digital twin task; and the obtaining module 111 is configured to receive the query result information from the terminal.

Optionally, the execution module 112 is specifically configured to: when a first condition is satisfied, determine that the terminal is allowed to execute the digital twin task, where the first condition includes at least one of the following:

the authorization information includes allowing execution of the digital twin service or complying with the subscription information of the digital twin service;

the subscription information includes allowing execution of the digital twin task;

a subscription type in the subscription information is a first type;

the subscription type in the subscription information is a third type, and the obtained query result information indicates that the terminal allows the digital twin task; or the subscription type in the subscription information is a third type, and the authorization information includes allowing execution of the digital twin service;

the terminal complies with a condition under which the terminal is allowed to execute the digital twin task, in the subscription information and/or the authorization information; and the digital twin task complies with a range within which execution of the digital twin task is allowed, in the subscription information and/or the authorization information.

Optionally, the execution module 112 is specifically configured to: when a second condition is satisfied, determine that the terminal is disallowed to execute the digital twin task, where the second condition includes at least one of the following:

the authorization information includes disallowing execution of the digital twin service;

the subscription information includes disallowing execution of the digital twin task;

a subscription type in the subscription information is a second type;

the subscription type in the subscription information is the third type, and the obtained query result information indicates that the terminal disallows the digital twin task; or the subscription type in the subscription information is the third type, and the authorization information includes disallowing execution of the digital twin service;

the terminal does not comply with the condition under which the terminal is allowed to execute the digital twin task, in the subscription information and/or the authorization information, or the terminal complies with a condition under which the terminal is disallowed to execute the digital twin task, in the subscription information and/or the authorization information; and the digital twin task does not comply with the range within which execution of the digital twin task is allowed, in the subscription information and/or the authorization information, or the digital twin task complies with a range within which execution of the digital twin task is disallowed, in the subscription information and/or the authorization information.

Optionally, the execution module 112 is specifically configured to: when a third condition is satisfied, determine to accept the digital twin task, where the third condition includes at least one of the following:

at least one terminal satisfies a condition under which the terminal is allowed to execute the digital twin task, in the subscription information and/or the authorization information;

the digital twin task satisfies a range within which execution of the digital twin task is allowed, in the subscription information and/or the authorization information;

the authorization information includes allowing execution of the digital twin service or complying with the subscription information of the digital twin service;

the subscription information includes allowing execution of the digital twin task;

a subscription type in the subscription information is a first type;

the subscription type in the subscription information is a third type, and the obtained query result information indicates that the terminal allows the digital twin task; or the subscription type in the subscription information is a third type, and the authorization information includes allowing execution of the digital twin service;

the terminal complies with the condition under which the terminal is allowed to execute the digital twin task, in the subscription information and/or the authorization information; and the digital twin task complies with the range within which execution of the digital twin task is allowed, in the subscription information and/or the authorization information.

Optionally, the execution module 112 is specifically configured to: when a fourth condition is satisfied, determine not to accept the digital twin task, where the fourth condition includes at least one of the following:

no terminal satisfies the condition under which the terminal is allowed to execute the digital twin task, in the subscription information and/or the authorization information;

the digital twin task does not satisfy the range within which execution of the digital twin task is allowed, in the subscription information and/or the authorization information;

the authorization information includes disallowing execution of the digital twin service;

the subscription information includes disallowing execution of the digital twin task;

a subscription type in the subscription information is a second type;

the subscription type in the subscription information is the third type, and the obtained query result information indicates that the terminal disallows the digital twin task; or the subscription type in the subscription information is the third type, and the authorization information includes disallowing execution of the digital twin service;

the terminal does not comply with the condition under which the terminal is allowed to execute the digital twin task, in the subscription information and/or the authorization information, or the terminal complies with a condition under which the terminal is disallowed to execute the digital twin task, in the subscription information and/or the authorization information; and the digital twin task does not comply with the range within which execution of the digital twin task is allowed, in the subscription information and/or the authorization information, or the digital twin task complies with a range within which execution of the digital twin task is disallowed, in the subscription information and/or the authorization information.

Optionally, the execution module 112 is specifically configured to: when a fifth condition is satisfied, determine a list of candidate terminals for the digital twin service, where the fifth condition includes at least one of the following:

the authorization information includes allowing execution of the digital twin service or complying with the subscription information of the digital twin service;

the subscription information includes allowing execution of the digital twin service;

a subscription type in the subscription information is a first type;

a subscription type of the digital twin service of the terminal is a third type, and the obtained query result information indicates that the terminal allows the digital twin task; or the subscription type in the subscription information is a third type, and the authorization information includes allowing execution of the digital twin service; and the terminal complies with a condition under which the terminal is allowed to execute the digital twin task, in the subscription information and/or the authorization information.

Optionally, the sending module is specifically configured to: when a sixth condition is satisfied, send the first query information to the terminal, where the sixth condition includes at least one of the following:

a subscription type in the subscription information is a third type;

a subscription type in the authorization information is a third type; and there is no subscription information or authorization information of the digital twin service of the terminal.

Optionally, the digital twin task authorization apparatus 110 includes:

a receiving module, configured to receive a digital twin task request, where the digital twin task request includes description information of the digital twin service.

Optionally, the digital twin task request includes a list of terminals selected to execute the digital twin service; or the digital twin task request does not include a list of terminals selected to execute the digital twin service.

In this embodiment of this application, the digital twin task authorization apparatus 110 can implement each process implemented in the method embodiment shown in FIG. 2 of this application, with the same beneficial effect achieved. To avoid repetition, details are not described herein again.

Figure 12:
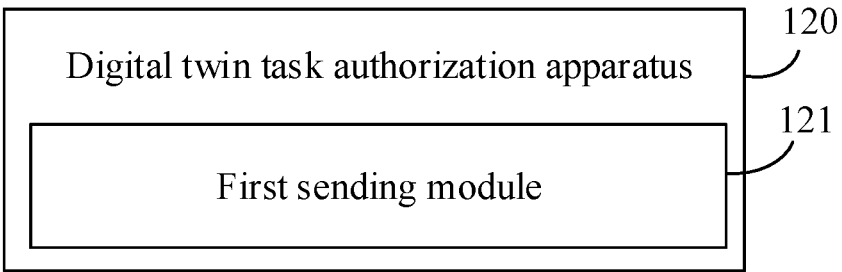
FIG. 12 is a structural diagram of another digital twin task authorization apparatus according to an embodiment of this application.

FIG. 12 is a schematic structural diagram of a digital twin task authorization apparatus according to an embodiment of this application. The apparatus is applied to a second communications device. As shown in FIG. 12, the digital twin task authorization apparatus 120 includes:

a first sending module 121, configured to send second information, where the second information includes:

authorization information of a digital twin service of a terminal, or authorization information of a digital twin service of a terminal and validity time information of the authorization information.

Optionally, the second information is carried and sent in one of the following: a registration request message, a service request message, and query result information, where the query result information is used to indicate that the terminal allows or disallows a digital twin task.

In this embodiment of this application, the digital twin task authorization apparatus 120 can implement each process implemented in the method embodiment shown in FIG. 3 of this application, with the same beneficial effect achieved. To avoid repetition, details are not described herein again.

Figure 13:
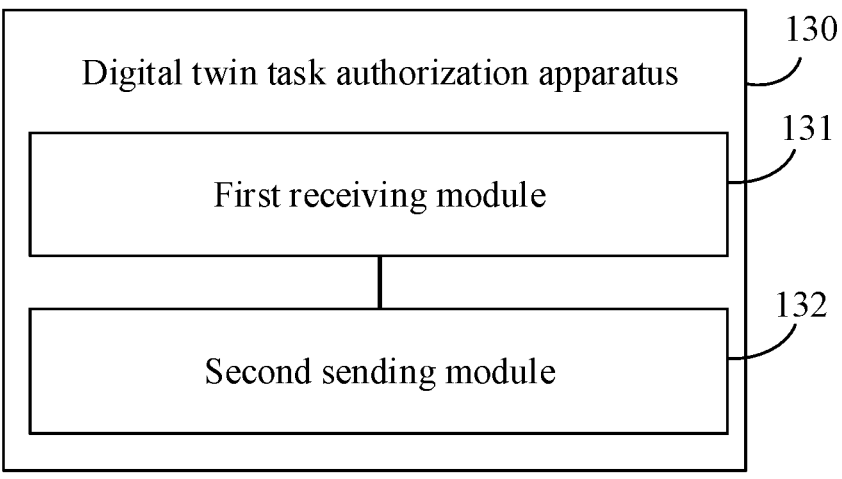
FIG. 13 is a structural diagram of another digital twin task authorization apparatus according to an embodiment of this application.

FIG. 13 is a schematic structural diagram of a digital twin task authorization apparatus according to an embodiment of this application. The apparatus is applied to a third communications device. As shown in FIG. 13, the digital twin task authorization apparatus 130 includes:

a first receiving module 131, configured to receive first query information, where the first query information is used to query whether a terminal is allowed to execute a digital twin task; and a second sending module 132, configured to send query result information, where the query result information is used to indicate that the terminal allows or disallows the digital twin task.

Optionally, the first query information includes at least one of the following:

description information of the digital twin task and a query request for authorization of the digital twin task.

Optionally, the description information of the digital twin task includes at least one of the following:

a type of the twin task;

requiring an installation package or not requiring an installation package;

a permission requirement on the terminal;

a capability requirement on the terminal;

power consumption on the terminal;

resource consumption on the terminal;

a task execution location; and a task execution time.

Optionally, the query result information includes:

authorization information of a digital twin service of the terminal, or authorization information of a digital twin service of the terminal and validity time information of the authorization information.

In this embodiment of this application, the digital twin task authorization apparatus 130 can implement each process implemented in the method embodiment shown in FIG. 4 of this application, with the same beneficial effect achieved. To avoid repetition, details are not described herein again.

Figure 14:
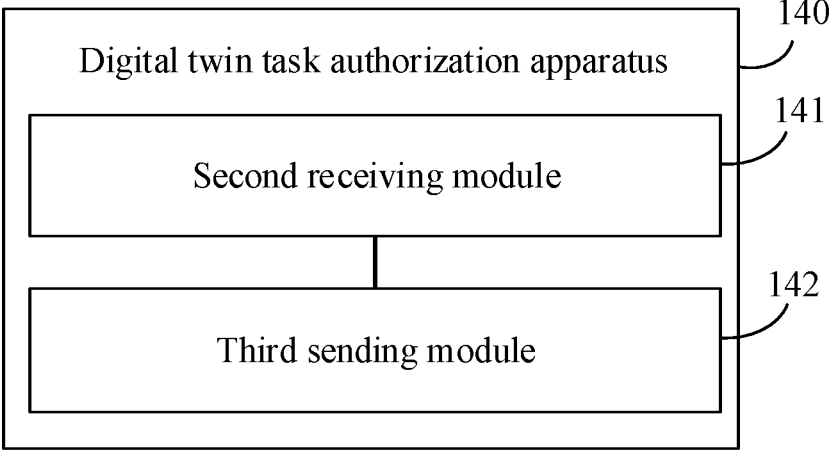
FIG. 14 is a structural diagram of another digital twin task authorization apparatus according to an embodiment of this application.

FIG. 14 is a schematic structural diagram of a digital twin task authorization apparatus according to an embodiment of this application. The apparatus is applied to a fourth communications device. As shown in FIG. 14, the digital twin task authorization apparatus 140 includes:

a second receiving module 141, configured to receive an information obtaining request; and a third sending module 142, configured to send third information, where the information obtaining request is used to obtain one of the following: the third information, subscription information of a terminal, and information related to a digital twin service of the terminal; and the third information includes at least one of the following:

subscription information of the digital twin service of the terminal;

authorization information of the digital twin service of the terminal;

authorization information of the digital twin service of the terminal and validity time information of the authorization information; and a list of candidate terminals for the digital twin service.

In this embodiment of this application, the digital twin task authorization apparatus 140 can implement each process implemented in the method embodiment shown in FIG. 5 of this application, with the same beneficial effect achieved. To avoid repetition, details are not described herein again.

Figure 15:
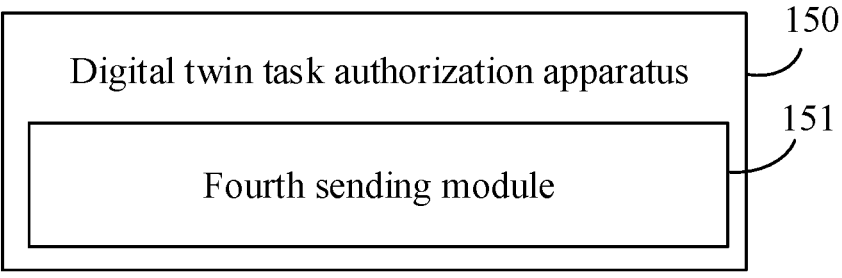
FIG. 15 is a structural diagram of another digital twin task authorization apparatus according to an embodiment of this application.

FIG. 15 is a schematic structural diagram of a digital twin task authorization apparatus according to an embodiment of this application. The apparatus is applied to a fifth communications device. As shown in FIG. 15, the digital twin task authorization apparatus 150 includes:

a fourth sending module 151, configured to send a digital twin task request, where the digital twin task request includes description information of a digital twin service.

Optionally, the digital twin task request includes a list of terminals selected to execute a digital twin task; or the digital twin task request does not include a list of terminals selected to execute a digital twin task.

Optionally, the digital twin task authorization apparatus 150 further includes:

a third receiving module, configured to receive indication information, where the indication information is used to indicate whether a digital twin task is accepted, where in a case that the digital twin task is accepted, the digital twin task request further includes a list of terminals allowing the digital twin task.

In this embodiment of this application, the digital twin task authorization apparatus 150 can implement each process implemented in the method embodiment shown in FIG. 6 of this application, with the same beneficial effect achieved. To avoid repetition, details are not described herein again.

Figure 16:
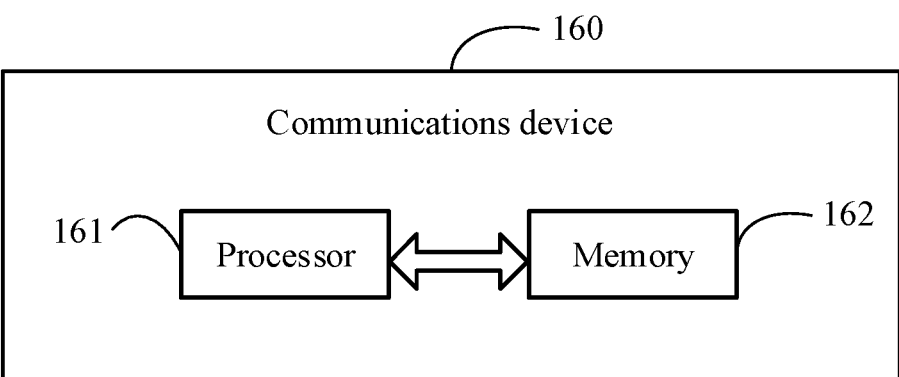
FIG. 16 is a structural diagram of a communications device according to an embodiment of this application.

Optionally, as shown in FIG. 16, an embodiment of this application further provides a communications device 160, including a processor 161, a memory 162, and a program or instructions stored in the memory 162 and capable of running on the processor 161. When the program or instructions are executed by the processor 161, each process of the digital twin task authorization method embodiment shown in FIG. 2 is implemented, or each process of the digital twin task authorization method embodiment shown in FIG. 3 is implemented, or each process of the digital twin task authorization method embodiment shown in FIG. 4 is implemented, or each process of the digital twin task authorization method embodiment shown in FIG. 5 is implemented, or each process of the digital twin task authorization method embodiment shown in FIG. 6 is implemented, with the same technical effect achieved. To avoid repetition, details are not described herein again.

An embodiment of this application further provides a readable storage medium. The readable storage medium stores a program or instructions. When the program or instructions are executed by a processor, each process of the foregoing digital twin task authorization method embodiment is implemented, with the same technical effect achieved. To avoid repetition, details are not described herein again.

The processor is a processor in the terminal in the foregoing embodiment. The readable storage medium includes a computer-readable storage medium, for example, a computer read-only memory (ROM), a random access memory (RAM), a magnetic disk, or an optical disc.

In addition, an embodiment of this application provides a chip, where the chip includes a processor and a communications interface, the communications interface is coupled to the processor, and the processor is configured to run a program or instructions to implement each process of the foregoing digital twin task authorization method embodiment, with the same technical effect achieved. To avoid repetition, details are not described herein again.

It should be understood that the chip provided in this embodiment of this application may also be referred to as a system-level chip, a system chip, a chip system, a system-on-chip, or the like.

In addition, an embodiment of this application provides a computer program or program product. The computer program or program product is stored in a non-volatile storage medium. The computer program or program product is executed by at least one processor to implement each process of the foregoing method embodiment, with the same technical effect achieved. To avoid repetition, details are not described herein again.

It should be noted that in this specification, the term "include", "include", or any of their variants are intended to cover a non-exclusive inclusion, so that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude existence of other identical elements in the process, method, article, or apparatus that includes the element. In addition, it should be noted that the scope of the method and apparatus in the implementations of this application is not limited to performing the functions in an order shown or discussed, and may further include performing the functions in a substantially simultaneous manner or in a reverse order depending on the functions used. For example, the method described may be performed in an order different from that described, and various steps may be added, omitted, or combined. In addition, features described with reference to some examples may be combined in other examples.

According to the foregoing description of the implementations, a person skilled in the art may clearly understand that the methods in the foregoing embodiments may be implemented by using software in combination with a necessary general hardware platform, and certainly may alternatively be implemented by using hardware. However, in most cases, the former is a preferred implementation. Based on such an understanding, the technical solutions of this application essentially or the part contributing to the prior art may be implemented in a form of a computer software product. The computer software product is stored in a storage medium (such as a ROM/RAM, a magnetic disk, or an optical disc), and includes several instructions for instructing a terminal (which may be a mobile phone, a computer, a server, an air conditioner, a network-side device, or the like) to perform the methods described in the embodiments of this application.

The foregoing describes the embodiments of this application with reference to the accompanying drawings. However, this application is not limited to the foregoing specific embodiments. The foregoing specific embodiments are merely illustrative rather than restrictive. Inspired by this application, a person of ordinary skill in the art may develop many other manners without departing from principles of this application and the protection scope of the claims, and all such manners fall within the protection scope of this application.

What is claimed is:

1. A digital twin task authorization method, comprising:

obtaining, by a first communications device, first information, wherein the first communications device comprises a network element used for twin task management; and performing, by the first communications device based on the first information, a first operation related to digital twin task authorization, wherein the first information comprises at least one of the following:

subscription information of a digital twin service of a terminal;

authorization information of the digital twin service of the terminal, or authorization information of the digital twin service of the terminal and validity time information of the authorization information; or query result information, wherein the query result information is used to indicate that the terminal allows or disallows a digital twin task;

wherein the subscription information comprises at least one of the following:

allowing or disallowing execution of the digital twin service;

a condition under which the terminal is allowed to execute the digital twin task, and/or a condition under which the terminal is disallowed to execute the digital twin task;

a subscription type; or a range within which execution of the digital twin task is allowed, and/or a range within which execution of the digital twin task is disallowed;

wherein the authorization information comprises at least one of the following:

complying with the subscription information of the digital twin service;

allowing or disallowing execution of the digital twin service;

a condition under which the terminal is allowed to execute the digital twin task, and/or a condition under which the terminal is disallowed to execute the digital twin task; or a range within which execution of the digital twin task is allowed, and/or a range within which execution of the digital twin task is disallowed;

wherein the subscription type comprises any one of the following:

a first type, wherein the first type indicates that execution of the digital twin service is allowed;

a second type, wherein the second type indicates that execution of the digital twin service is disallowed; or a third type, wherein the third type indicates that when the digital twin task of the terminal arrives, the terminal needs to be queried about whether the terminal is allowed to execute the digital twin task.

2. The method according to claim 1, wherein the authorization information of the digital twin service of the terminal is obtained from one of the following: the terminal, an application function (AF), and a network element used for user data management; and/or the query result information is obtained from one of the following: the terminal, the AF, and the network element used for user data management.

3. The method according to claim 1, wherein the performing a first operation related to digital twin task authorization comprises at least one of the following:

determining that the terminal is allowed or disallowed to execute the digital twin task;

determining to accept or not to accept the digital twin task;

determining a list of candidate terminals for the digital twin service; or sending first query information, wherein the first query information is used to query whether the terminal is allowed to execute the digital twin task.

4. The method according to claim 3, wherein the performing a first operation related to digital twin task authorization comprises: determining to accept an arriving digital twin task; and determining a list of terminals for the accepted digital twin task.

5. The method according to claim 1, wherein the condition under which the terminal is allowed to execute the digital twin task comprises at least one of the following:

a first location interval range of the terminal;

a first time period range;

a first available power range of the terminal; or a first available resource range of the terminal; and/or the range within which execution of the digital twin task is allowed comprises at least one of the following:

a second location interval range;

a second time period range;

a first power consumption range of the task;

a first terminal capability range required by the task;

a first resource consumption range of the task;

description information of the allowed digital twin task; or information about a requester allowed to request the twin task; and/or the condition under which the terminal is disallowed to execute the digital twin task comprises at least one of the following:

a third location interval range of the terminal;

a third time period range;

a second available power range of the terminal; or a second available resource range of the terminal; and/or the range within which execution of the digital twin task is disallowed comprises at least one of the following:

a fourth location interval range;

a fourth time period range;

a second power consumption range of the task;

a second terminal capability range required by the task;

a second resource consumption range of the task;

description information of the disallowed digital twin task; or information about a requester disallowed to request the twin task;

wherein the description information of the allowed digital twin task or the description information of the disallowed digital twin task comprises at least one of the following:

a type of the twin task;

requiring an installation package or not requiring an installation package;

a permission requirement on the terminal;

a capability requirement on the terminal;

power consumption on the terminal;

resource consumption on the terminal;

a task execution location; or a task execution time.

6. The method according to claim 1, wherein in a case that the first information comprises the authorization information of the digital twin service of the terminal and the subscription information of the digital twin service of the terminal, at least one of the following is satisfied:

a priority of the authorization information is higher than a priority of the subscription information;

when the authorization information comprises allowing execution of the digital twin service or complying with the subscription information of the digital twin service, the first operation related to digital twin task authorization is performed based on the subscription information; or when the authorization information comprises disallowing execution of the digital twin service, the first operation performed based on the authorization information comprises at least one of the following: determining that the terminal is disallowed to execute the digital twin task, or determining not to accept the digital twin task.

7. The method according to claim 1, wherein the first information comprises the query result information; and before the obtaining first information, the method further comprises:

when the digital twin task arrives, sending, by the first communications device, first query information to the terminal, wherein the first query information is used to query whether the terminal is allowed to execute the digital twin task; and the obtaining first information comprises:

receiving, by the first communications device, the query result information from the terminal.

8. The method according to claim 1, wherein the performing a first operation related to digital twin task authorization comprises:

when a first condition is satisfied, determining, by the first communications device, that the terminal is allowed to execute the digital twin task, wherein the first condition comprises at least one of the following:

the authorization information comprises allowing execution of the digital twin service or complying with the subscription information of the digital twin service;

the subscription information comprises allowing execution of the digital twin task;

a subscription type in the subscription information is a first type;

the subscription type in the subscription information is a third type, and the obtained query result information indicates that the terminal allows the digital twin task; or the subscription type in the subscription information is a third type, and the authorization information comprises allowing execution of the digital twin service;

the terminal complies with a condition under which the terminal is allowed to execute the digital twin task, in the subscription information and/or the authorization information; or the digital twin task complies with a range within which execution of the digital twin task is allowed, in the subscription information and/or the authorization information;

and/or the performing a first operation related to digital twin task authorization comprises:

when a second condition is satisfied, determining, by the first communications device, that the terminal is disallowed to execute the digital twin task, wherein the second condition comprises at least one of the following:

the authorization information comprises disallowing execution of the digital twin service;

the subscription information comprises disallowing execution of the digital twin task;

a subscription type in the subscription information is a second type;

the subscription type in the subscription information is the third type, and the obtained query result information indicates that the terminal disallows the digital twin task; or the subscription type in the subscription information is the third type, and the authorization information comprises disallowing execution of the digital twin service;

the terminal does not comply with the condition under which the terminal is allowed to execute the digital twin task, in the subscription information and/or the authorization information, or the terminal complies with a condition under which the terminal is disallowed to execute the digital twin task, in the subscription information and/or the authorization information; or the digital twin task does not comply with the range within which execution of the digital twin task is allowed, in the subscription information and/or the authorization information, or the digital twin task complies with a range within which execution of the digital twin task is disallowed, in the subscription information and/or the authorization information.

9. The method according to claim 1, wherein the performing a first operation related to digital twin task authorization comprises:

when a third condition is satisfied, determining, by the first communications device, to accept the digital twin task, wherein the third condition comprises at least one of the following:

at least one terminal satisfies a condition under which the terminal is allowed to execute the digital twin task, in the subscription information and/or the authorization information;

the digital twin task satisfies a range within which execution of the digital twin task is allowed, in the subscription information and/or the authorization information;

the authorization information comprises allowing execution of the digital twin service or complying with the subscription information of the digital twin service;

the subscription information comprises allowing execution of the digital twin task;

a subscription type in the subscription information is a first type;

the subscription type in the subscription information is a third type, and the obtained query result information indicates that the terminal allows the digital twin task; or the subscription type in the subscription information is a third type, and the authorization information comprises allowing execution of the digital twin service;

the terminal complies with the condition under which the terminal is allowed to execute the digital twin task, in the subscription information and/or the authorization information; or the digital twin task complies with the range within which execution of the digital twin task is allowed, in the subscription information and/or the authorization information;

and/or the performing a first operation related to digital twin task authorization comprises:

when a fourth condition is satisfied, determining, by the first communications device, not to accept the digital twin task, wherein the fourth condition comprises at least one of the following:

no terminal satisfies the condition under which the terminal is allowed to execute the digital twin task, in the subscription information and/or the authorization information;

the digital twin task does not satisfy the range within which execution of the digital twin task is allowed, in the subscription information and/or the authorization information;

the authorization information comprises disallowing execution of the digital twin service;

the subscription information comprises disallowing execution of the digital twin task;

a subscription type in the subscription information is a second type;

the subscription type in the subscription information is the third type, and the obtained query result information indicates that the terminal disallows the digital twin task; or the subscription type in the subscription information is the third type, and the authorization information comprises disallowing execution of the digital twin service;

the terminal does not comply with the condition under which the terminal is allowed to execute the digital twin task, in the subscription information and/or the authorization information, or the terminal complies with a condition under which the terminal is disallowed to execute the digital twin task, in the subscription information and/or the authorization information; or the digital twin task does not comply with the range within which execution of the digital twin task is allowed, in the subscription information and/or the authorization information, or the digital twin task complies with a range within which execution of the digital twin task is disallowed, in the subscription information and/or the authorization information.

10. The method according to claim 1, wherein the performing a first operation related to digital twin task authorization comprises:

when a fifth condition is satisfied, determining, by the first communications device, a list of candidate terminals for the digital twin service, wherein the fifth condition comprises at least one of the following:

the authorization information comprises allowing execution of the digital twin service or complying with the subscription information of the digital twin service;

the subscription information comprises allowing execution of the digital twin service;

a subscription type in the subscription information is a first type;

a subscription type of the digital twin service of the terminal is a third type, and the obtained query result information indicates that the terminal allows the digital twin task; or the subscription type in the subscription information is a third type, and the authorization information comprises allowing execution of the digital twin service; or the terminal complies with a condition under which the terminal is allowed to execute the digital twin task, in the subscription information and/or the authorization information.

11. The method according to claim 7, wherein the sending first query information to the terminal comprises:

when a sixth condition is satisfied, sending, by the first communications device, the first query information to the terminal, wherein the sixth condition comprises at least one of the following:

a subscription type in the subscription information is a third type;

a subscription type in the authorization information is a third type; or there is no subscription information or authorization information of the digital twin service of the terminal.

12. The method according to claim 1, wherein the method further comprises:

receiving, by the first communications device, a digital twin task request, wherein the digital twin task request comprises description information of the digital twin service;

wherein the digital twin task request comprises a list of terminals selected to execute the digital twin service; or the digital twin task request does not comprise a list of terminals selected to execute the digital twin service.

13. A digital twin task authorization method, comprising:

sending, by a second communications device, second information to a first communications device, wherein the first communications device comprises a network element used for twin task management, wherein the second information comprises:

authorization information of a digital twin service of a terminal, or authorization information of a digital twin service of a terminal and validity time information of the authorization information;

wherein the authorization information comprises at least one of the following:

complying with subscription information of the digital twin service;

allowing or disallowing execution of the digital twin service;

a condition under which the terminal is allowed to execute a digital twin task, and/or a condition under which the terminal is disallowed to execute the digital twin task; or a range within which execution of the digital twin task is allowed, and/or a range within which execution of the digital twin task is disallowed.

14. The method according to claim 13, wherein the second information is carried and sent in one of the following: a registration request message, a service request message, and query result information, wherein the query result information is used to indicate that the terminal allows or disallows a digital twin task; or, wherein the sending second information comprises:

in a case that a seventh condition is satisfied, sending, by the second communications device, the second information, wherein the seventh condition comprises at least one of the following:

the second information is generated or updated;

a user sets the second information; or the second communications device preconfigures the second information.

15. A digital twin task authorization method, comprising:

receiving, by a third communications device, first query information from a first communications device, wherein the first communication devices comprises a network element used for twin task management, wherein the first query information is used to query whether a terminal is allowed to execute a digital twin task; and sending, by the third communications device, query result information, wherein the query result information is used to indicate that the terminal allows or disallows the digital twin task.

16. The method according to claim 15, wherein the first query information comprises at least one of the following:

description information of the digital twin task or a query request for authorization of the digital twin task;

wherein the description information of the digital twin task comprises at least one of the following:

a type of the twin task;

requiring an installation package or not requiring an installation package;

a permission requirement on the terminal;

a capability requirement on the terminal;

power consumption on the terminal;

resource consumption on the terminal;

a task execution location; or a task execution time;

or, wherein the query result information further comprises:

authorization information of a digital twin service of the terminal, or authorization information of a digital twin service of the terminal and validity time information of the authorization information.

17. The method according to claim 13, wherein the second communications device is a terminal or an Application Function (AF).

18. The method according to claim 15, wherein the third communications device is a terminal.

\* \* \* \* \*